United States Patent
Åström et al.

(10) Patent No.: US 12,170,970 B2
(45) Date of Patent: Dec. 17, 2024

(54) METHODS TO CONFIGURE NEIGHBOR CELL RESYNCHRONIZATION SIGNAL (RSS) PARAMETERS

(71) Applicant: Telefonaktiebolaget LM Ericsson (PUBL), Stockholm (SE)

(72) Inventors: Magnus Åström, Lund (SE); Ritesh Shreevastav, Upplands Väsby (SE); Stefan Wänstedt, Luleå (SE); Johan Bergman, Stockholm (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 646 days.

(21) Appl. No.: 17/427,699

(22) PCT Filed: Feb. 13, 2020

(86) PCT No.: PCT/SE2020/050160
§ 371 (c)(1),
(2) Date: Aug. 2, 2021

(87) PCT Pub. No.: WO2020/167233
PCT Pub. Date: Aug. 20, 2020

(65) Prior Publication Data
US 2022/0132446 A1   Apr. 28, 2022

Related U.S. Application Data

(60) Provisional application No. 62/805,758, filed on Feb. 14, 2019.

(51) Int. Cl.
H04W 56/00 (2009.01)
H04L 1/1607 (2023.01)
H04L 5/00 (2006.01)

(52) U.S. Cl.
CPC ......... *H04W 56/001* (2013.01); *H04L 1/1614* (2013.01); *H04L 5/0048* (2013.01); *H04L 5/0094* (2013.01)

(58) Field of Classification Search
CPC .. H04W 56/001; H04L 1/1614; H04L 5/0048; H04L 5/0094; H04L 5/0053
See application file for complete search history.

(56) References Cited

U.S. PATENT DOCUMENTS

| 11,383,157 B2 * | 7/2022 | Suzuki | H04M 11/00 |
| 2021/0195457 A1 * | 6/2021 | Kim | H04L 5/0023 |
| 2021/0306888 A1 * | 9/2021 | Kim | H04W 24/08 |

FOREIGN PATENT DOCUMENTS

| CN | 106031110 A | 10/2016 |
| EP | 2 073 591 A2 | 6/2009 |

(Continued)

OTHER PUBLICATIONS

Official Action issued for Chinese Application No. 202080014335.2—Oct. 26, 2023.

(Continued)

*Primary Examiner* — Robert C Scheibel
(74) *Attorney, Agent, or Firm* — Baker Botts L.L.P.

(57) ABSTRACT

Embodiments include methods, performed by a network node in a wireless network, for signaling resynchronization signal (RSS) configurations of neighbor cells to one or more user equipment (UEs). Such methods include encoding a plurality of parameters of respective RSS configurations of one or more neighbor cells. For each particular neighbor cell, the parameters can include one or more RSS frequency locations and an RSS time offset for the particular neighbor cell, and the encoding can be based on a bitmap and a parameter associated with the particular neighbor cell (e.g., a physical cell ID). Such methods also include transmitting, to the one or more UEs, at least a portion of the encoded (Continued)

parameters of the respective RSS configurations of the neighbor cells. Embodiments also include complementary methods performed by UEs, as well as network nodes and UEs configured to perform such methods.

22 Claims, 15 Drawing Sheets

(56) References Cited

FOREIGN PATENT DOCUMENTS

| WO | WO2018083158 A1 | 5/2018 |
|---|---|---|
| WO | 2018 224012 A1 | 12/2018 |

OTHER PUBLICATIONS

Search Report issued for Chinese Application No. 2020800143352—Oct. 24, 2023.

3GPP TR 38.801 v14.0.0; Technical Report; 3rd Generation Partnership Project; Technical Specification Group Radio Access Network; Study on new radio access technology; Radio access architecture and interfaces (Release 14)—Mar. 2017.

3GPP TS 36.211 v15.4.0; Technical Specification; 3rd Generation Partnership Project; Technical Specification Group Radio Access Network; Evolved Universal Terrestrial Radio Access (E-UTRA); Physical channels and modulation (Release 15)—Dec. 2018.

3GPP TS 36.331 v14.9.0; Technical Specification; 3rd Generation Partnership Project; Technical Specification Group Radio Access Network; Evolved Universal Terrestrial Radio Access (E-UTRA); Radio Resource Control (RRC); Protocol specification (Release 14)—Dec. 2018.

3GPP TS 38.401 v15.4.0; Technical Specification; 3rd Generation Partnership Project; Technical Specification Group Radio Access Network; NG-RAN; Architecture description (Release 15)—Dec. 2018.

3GPP TSG RAN WG1 Meeting #94bis; Chengdu, China; Source: Sony; Title: Summary on use of RSS for measurement improvements (R1-1811641)—Oct. 8-12, 2018.

3GPP TSG-RAN WG1 Meeting #99; Reno, USA; Source: WI rapporteur (Ericsson); Title: RAN1 agreements for Rel-16 Additional MTC Enhancements for LTE (R1-1913594)—Nov. 18-22, 2019.

PCT International Search Report issued for International application No. PCT/SE2020/050160—Apr. 29, 2020.

PCT Written Opinion of the International Searching Authority issued for International application No. PCT/SE2020/050160—Apr. 29, 2020.

* cited by examiner

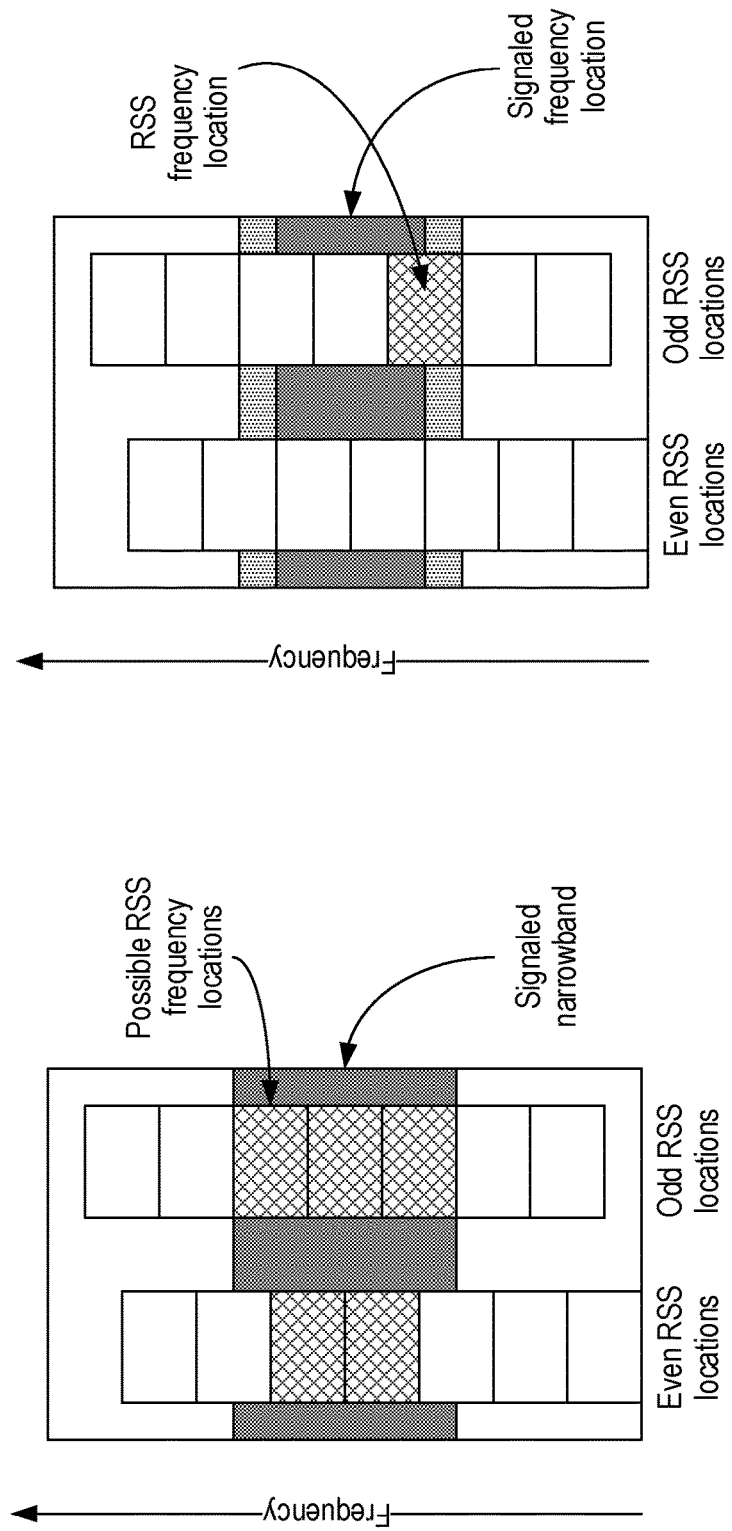

```
EstablishmentCause ::= ENUMERATED {
                        emergency, highPriorityAccess, mt-Access,
                        mo-Signalling, mo-Data, delayTolerantAccess-v1020,
                        mo-VoiceCall-v1280, rss-Configuration
                       }
```

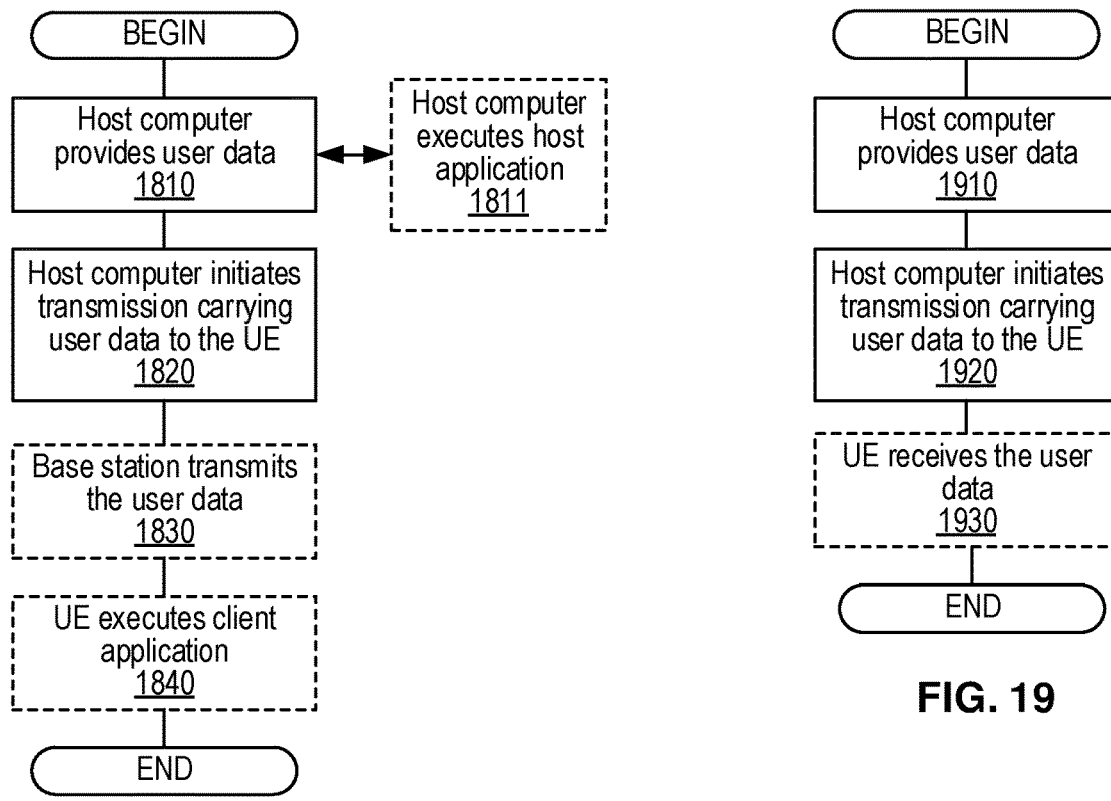
FIG. 18
FIG. 19
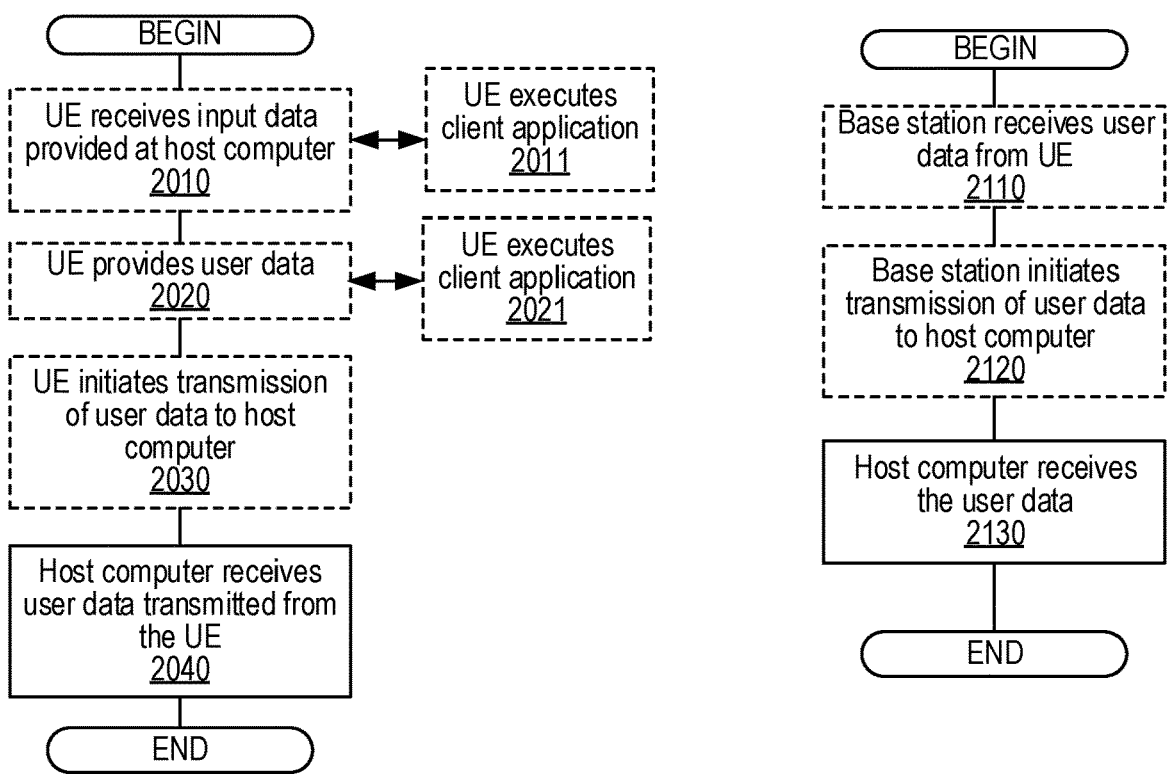
FIG. 20
FIG. 21

METHODS TO CONFIGURE NEIGHBOR CELL RESYNCHRONIZATION SIGNAL (RSS) PARAMETERS

PRIORITY

This nonprovisional application is a U.S. National Stage Filing under 35 U.S.C. § 371 of International Patent Application Serial No. PCT/SE2020/050160 filed Feb. 13, 2020 and entitled "Methods to Configure Neighbor Cell Resynchronization Signal (RSS) Parameters" which claims priority to U.S. Provisional Patent Application No. 62/805,758 filed Feb. 14, 2019 both of which are hereby incorporated by reference in their entirety.

TECHNICAL FIELD

The present invention generally relates to wireless communication networks, and particularly relates to improvements in operation of very-low-power devices in a wireless communication network.

BACKGROUND

Long-Term Evolution (LTE is an umbrella term for so-called fourth-generation (4G) radio access technologies developed within the Third-Generation Partnership Project (3GPP) and initially standardized in Releases 8 and 9, also known as Evolved UTRAN (E-UTRAN). LTE is targeted at various licensed frequency bands and is accompanied by improvements to non-radio aspects commonly referred to as System Architecture Evolution (SAE), which includes Evolved Packet Core (EPC) network. LTE continues to evolve through subsequent releases that are developed according to standards-setting processes with 3GPP and its working groups (WGs), including the Radio Access Network (RAN) WG, and sub-working groups (e.g., RAN1, RAN2, etc.).

LTE Release 10 (Rel-10) supports bandwidths larger than 20 MHz. One important requirement on Rel-10 is to assure backward compatibility with LTE Release-8. As such, a wideband LTE Rel-10 carrier (e.g., wider than 20 MHz) should appear as a number of carriers to an LTE Rel-8 ("legacy") terminal. Each such carrier can be referred to as a Component Carrier (CC). For an efficient use of a wide carrier also for legacy terminals, legacy terminals can be scheduled in all parts of the wideband LTE Rel-10 carrier. One exemplary way to achieve this is by means of Carrier Aggregation (CA), whereby a Rel-10 terminal can receive multiple CCs, each preferably having the same structure as a Rel-8 carrier. One of the enhancements in LTE Rel-11 is an enhanced Physical Downlink Control Channel (ePDCCH), which has the goals of increasing capacity and improving spatial reuse of control channel resources, improving inter-cell interference coordination (ICIC), and supporting antenna beamforming and/or transmit diversity for control channel. Furthermore, LTE Rel-12 introduced dual connectivity (DC) whereby a UE can be connected to two network nodes simultaneously, thereby improving connection robustness and/or capacity.

An overall exemplary architecture of a network comprising LTE and SAE is shown in FIG. 1. E-UTRAN 100 comprises one or more evolved Node B's (eNB), such as eNBs 105, 110, and 115, and one or more user equipment (UE), such as UE 120. As used within the 3GPP standards, "user equipment" or "UE" means any wireless communication device (e.g., smartphone or computing device) that is capable of communicating with 3GPP-standard-compliant network equipment, including E-UTRAN as well as UTRAN and/or GERAN, as the third- ("3G") and second-generation ("2G") 3GPP radio access networks are commonly known.

As specified by 3GPP, E-UTRAN 100 is responsible for all radio-related functions in the network, including radio bearer control, radio admission control, radio mobility control, scheduling, and dynamic allocation of resources to UEs in uplink and downlink, as well as security of the communications with the UE. These functions reside in the eNBs, such as eNBs 105, 110, and 115. The eNBs in the E-UTRAN communicate with each other via the X1 interface, as shown in FIG. 1. The eNBs also are responsible for the E-UTRAN interface to the EPC 130, specifically the S1 interface to the Mobility Management Entity (MME) and the Serving Gateway (SGW), shown collectively as MME/S-GWs 134 and 138 in FIG. 1. Generally speaking, the MME/S-GW handles both the overall control of the UE and data flow between the UE and the rest of the EPC. More specifically, the MME processes the signaling (e.g., control plane) protocols between the UE and the EPC, which are known as the Non-Access Stratum (NAS) protocols. The S-GW handles all Internet Protocol (IP) data packets (e.g., data or user plane) between the UE and the EPC, and serves as the local mobility anchor for the data bearers when the UE moves between eNBs, such as eNBs 105, 110, and 115.

EPC 130 can also include a Home Subscriber Server (HSS) 131, which manages user- and subscriber-related information. HSS 131 can also provide support functions in mobility management, call and session setup, user authentication and access authorization. The functions of HSS 131 can be related to the functions of legacy Home Location Register (HLR) and Authentication Centre (AuC) functions or operations.

In some embodiments, HSS 131 can communicate with a user data repository (UDR)—labelled EPC-UDR 135 in FIG. 1—via a Ud interface. The EPC-UDR 135 can store user credentials after they have been encrypted by AuC algorithms. These algorithms are not standardized (i.e., vendor-specific), such that encrypted credentials stored in EPC-UDR 135 are inaccessible by any other vendor than the vendor of HSS 131.

FIG. 2A shows a high-level block diagram of an exemplary LTE architecture in terms of its constituent entities—UE, E-UTRAN, and EPC—and high-level functional division into the Access Stratum (AS) and the Non-Access Stratum (NAS). FIG. 2A also illustrates two particular interface points, namely Uu (UE/E-UTRAN Radio Interface) and S1 (E-UTRAN/EPC interface), each using a specific set of protocols, i.e., Radio Protocols and S1 Protocols. Although not shown in FIG. 2A, each of the protocol sets can be further segmented into user plane and control plane protocol functionality. The user and control planes are also referred to as U-plane and C-plane, respectively. On the Uu interface, the U-plane carries user information (e.g., data packets) while the C-plane carries control information between UE and E-UTRAN.

FIG. 2B illustrates a block diagram of an exemplary C-plane protocol stack between a UE, an eNB, and an MME. The exemplary protocol stack includes Physical (PHY), Medium Access Control (MAC), Radio Link Control (RLC), Packet Data Convergence Protocol (PDCP), and Radio Resource Control (RRC) layers between the UE and eNB. The PHY layer is concerned with how and what characteristics are used to transfer data over transport channels on the LTE radio interface. The MAC layer provides data transfer services on logical channels, maps logical channels to PHY transport channels, and reallocates PHY resources to support these services. The RLC layer provides error detection and/or correction, concatenation, segmentation, and reassembly, reordering of data transferred to or from the upper layers. The PHY, MAC, and RLC layers perform identical functions for both the U-plane and the C-plane. The PDCP layer provides ciphering/deciphering and integrity protection for both U-plane and C-plane, as well as other functions for the U-plane such as header compression. The exemplary protocol stack also includes non-access stratum (NAS) signaling between the UE and the MME.

FIG. 2C shows a block diagram of an exemplary LTE radio interface protocol architecture from the perspective of the PHY layer. The interfaces between the various layers are provided by Service Access Points (SAPs), indicated by the ovals in FIG. 2C. The PHY layer interfaces with the MAC and RRC protocol layers described above. The PHY, MAC, and RRC are also referred to as Layers 1-3, respectively, in the figure. The MAC provides different logical channels to the RLC protocol layer (also described above), characterized by the type of information transferred, whereas the PHY provides a transport channel to the MAC, characterized by how the information is transferred over the radio interface. In providing this transport service, the PHY performs various functions including error detection and correction; rate-matching and mapping of the coded transport channel onto physical channels; power weighting, modulation, and demodulation of physical channels; transmit diversity; and beamforming multiple input multiple output (MIMO) antenna processing. The PHY layer also receives control information (e.g., commands) from RRC and provides various information to RRC, such as radio measurements.

The RRC layer controls communications between a UE and an eNB at the radio interface, as well as the mobility of a UE between cells in the E-UTRAN. After a UE is powered ON it will be in the RRC_IDLE state until an RRC connection is established with the network, at which time the UE will transition to RRC_CONNECTED state (e.g., where data transfer can occur). The UE returns to RRC_IDLE after the connection with the network is released. In RRC_IDLE state, the UE's radio is active on a discontinuous reception (DRX) schedule configured by upper layers. During DRX active periods (also referred to as "On durations"), an RRC_IDLE UE receives system information (SI) broadcast by a serving cell, performs measurements of neighbor cells to support cell reselection, and monitors a paging channel on PDCCH for pages from the EPC via eNB. RRC_IDLE UEs are known in EPC, have assigned IP addresses, but are not known (e.g., no stored context) at the serving eNB.

Generally speaking, a physical channel corresponds to a set of resource elements carrying information that originates from higher layers. Downlink (i.e., eNB to UE) physical channels provided by the LTE PHY include Physical Downlink Shared Channel (PDSCH), Physical Multicast Channel (PMCH), Physical Downlink Control Channel (PDCCH), Relay Physical Downlink Control Channel (R-PDCCH), Physical Broadcast Channel (PBCH), Physical Control Format Indicator Channel (PCFICH), and Physical Hybrid ARQ Indicator Channel (PHICH). In addition, the LTE PHY downlink includes various reference signals, synchronization signals, and discovery signals.

PBCH carries the basic system information, required by the UE to access the network. PDSCH is the main physical channel used for unicast DL data transmission, but also for transmission of RAR (random access response), certain system information blocks, and paging information. PHICH carries HARQ feedback (e.g., ACK/NAK) for UL transmissions by the UEs. Similarly, PDCCH carries DL scheduling assignments (e.g., for PDSCH), UL resource grants (e.g., for PUSCH), channel quality feedback (e.g., CSI) for the UL channel, and other control information.

Uplink (i.e., UE to eNB) physical channels provided by the LTE PHY include Physical Uplink Shared Channel (PUSCH), Physical Uplink Control Channel (PUCCH), and Physical Random Access Channel (PRACH). In addition, the LTE PHY uplink includes various reference signals including demodulation reference signals (DM-RS), which are transmitted to aid the eNB in the reception of an associated PUCCH or PUSCH; and sounding reference signals (SRS), which are not associated with any uplink channel.

PRACH is used for random access preamble transmission. PUSCH is the counterpart of PDSCH, used primarily for unicast UL data transmission. Similar to PDCCH, PUCCH carries uplink control information (UCI) such as scheduling requests, CSI for the DL channel, HARQ feedback for eNB DL transmissions, and other control information.

The multiple access scheme for the LTE PHY is based on Orthogonal Frequency Division Multiplexing (OFDM) with a cyclic prefix (CP) in the downlink, and on Single-Carrier Frequency Division Multiple Access (SC-FDMA) with a cyclic prefix in the uplink. To support transmission in paired and unpaired spectrum, the LTE PHY supports both Frequency Division Duplexing (FDD) (including both full- and half-duplex operation) and Time Division Duplexing (TDD). FIG. 3A shows an exemplary radio frame structure ("type 1") used for LTE FDD downlink (DL) operation. The DL radio frame has a fixed duration of 10 ms and consists of 20 slots, labeled 0 through 19, each with a fixed duration of 0.5 ms. A 1-ms subframe comprises two consecutive slots where subframe $_i$ consists of slots $_{2i}$ and $_{2i+1}$. Each exemplary FDD DL slot consists of $N^{DL}_{symb}$ OFDM symbols, each of which is comprised of $N_{sc}$ OFDM subcarriers. Exemplary values of $N^{DL}_{symb}$ can be 7 (with a normal CP) or 6 (with an extended-length CP) for subcarrier spacing (SCS) of 15 kHz. The value of $N_{sc}$ is configurable based upon the available channel bandwidth. Since persons of ordinary skill in the art are familiar with the principles of OFDM, further details are omitted in this description.

As shown in FIG. 3A, a combination of a particular subcarrier in a particular symbol is known as a resource element (RE). Each RE is used to transmit a particular number of bits, depending on the type of modulation and/or bit-mapping constellation used for that RE. For example, some REs may carry two bits using QPSK modulation, while other REs may carry four or six bits using 16- or 64-QAM, respectively. The radio resources of the LTE PHY are also defined in terms of physical resource blocks (PRBs). A PRB spans $N^{RB}_{sc}$ sub-carriers over the duration of a slot (i.e., $N^{DL}_{symb}$ Symbols), where $N^{RB}_{sc}$ is typically either 12 (with a 15-kHz sub-carrier bandwidth) or 24 (7.5-kHz bandwidth). A PRB spanning the same $N^{RB}_{sc}$ subcarriers during an entire subframe (i.e., $2N^{DL}_{symb}$ symbols) is known as a PRB pair. Accordingly, the resources available in a subframe of the LTE PHY DL comprise $N^{DL}_{RB}$ PRB pairs, each of which comprises $2N^{DL}_{symb} \cdot N^{RB}_{sc}$ REs. For a normal CP and 15-KHz SCS, a PRB pair comprises 168 REs.

FIG. 3B shows an exemplary LTE FDD uplink (UL) radio frame configured in a similar manner as the exemplary FDD DL radio frame shown in FIG. 3A. Using terminology consistent with the above DL description, each UL slot consists of $N^{UL}_{symb}$ OFDM symbols, each of which is comprised of $N_{sc}$ OFDM subcarriers.

As discussed above, the LTE PHY maps the various DL and UL physical channels to the resources shown in FIGS. 3A and 3B, respectively. Both PDCCH and PUCCH can be transmitted on aggregations of one or several consecutive control channel elements (CCEs), and a CCE is mapped to the physical resource based on resource element groups (REGs), each of which is comprised of a plurality of REs. For example, a CCE can comprise nine (9) REGs, each of which can comprise four (4) REs.

Logical channels reside between RLC and MAC layers in the LTE protocol stack. In general, logical channels are associated with a type of information being transferred. They can be broadly divided into control channels for the transfer of control plane information and traffic channels for the transfer of user plane information. Each logical channel is mapped to one or more transport channels, which are mapped to the physical channels discussed above.

In LTE, UL and DL data transmissions (e.g., on PUSCH and PDSCH, respectively) can take place with or without an explicit grant or assignment of resources by the network (e.g., eNB). In general, UL transmissions are usually referred to as being "granted" by the network (i.e., "UL grant"), while DL transmissions are usually referred to as taking place on resources that are "assigned" by the network (i.e., "DL assignment").

In case of a transmission based on an explicit grant/ assignment, downlink control information (DCI) is sent to the UE informing it of specific radio resources to be used for the transmission. In contrast, transmission without an explicit grant/assignment is typically configured to occur with a defined periodicity. Given a periodic and/or recurring UL grant and/or DL assignment, the UE can then initiate a data transmission and/or receive data according to a predefined configuration and/or schedule. Such transmissions can be referred to as semi-persistent scheduling (SPS), configured grant (CG), or grant-free transmissions. In general, when referring to an UL transmission without an explicit grant as a "configured grant transmission," this term can include all types of pre-configured transmission patterns, including both SPS and grant-free operation.

Recently, there has been a significant amount of 3GPP standardization activity toward specifying LTE enhancements to cover Machine-to-Machine (M2M) and/or Internet of Things (IoT) related use cases. 3GPP Releases 13 (Rel-13) and 14 (Rel-14) include enhancements to support Machine-Type Communications (MTC) with new UE categories (e.g., Cat-M1, Cat-M2), supporting reduced bandwidth of six physical resource blocks (PRBs) (or up to 24 PRBs for Cat-M2), and Narrowband IoT (NB-IoT) UEs having a new NB radio interface with corresponding new UE categories (e.g., Cat-NB1 and Cat-NB2). In the following discussion, the term "eMTC" is used to distinguish MTC-related LTE enhancements introduced in 3GPP Releases 13-15 from NB-IoT-specific features.

In RRC_CONNECTED state, a UE monitors PDCCH for scheduled PDSCH/PUSCH and for other purposes. In LTE networks, depending on discontinuous reception (DRX) setting, a UE may spend a substantial part of its stored energy (e.g., in the UE's battery) on decoding PDCCH without detecting a PDSCH/PUSCH scheduled for it. Techniques that can reduce unnecessary PDCCH monitoring or allowing UE to go to sleep or wake-up only when required can be beneficial.

It is also desirable to reduce the UE's energy consumption in IDLE mode, such as by allowing the UE to "sleep" for longer periods of time between waking up and looking for paging messages from the network (e.g., the UE's serving eNB). Even so, increasing the duration of sleep periods also increases the likelihood that the UE will lose synchronization with its serving eNB while asleep, due to drifts in phase and frequency of the UE's internal reference oscillator (e.g., clock). To facilitate easier and faster synchronization after wakeup, a new Resynchronization Signal (RSS) was also introduced in Rel-15. Nevertheless, there are certain problems, issues, and/or drawbacks related to a network signaling the configurations of such RSS to UEs, particularly to UEs in poor coverage areas.

SUMMARY

Embodiments of the present disclosure provide specific improvements to communication between user equipment (UE) and network nodes in a wireless communication network, such as by facilitating solutions to overcome the exemplary problems summarized above and described in more detail below.

Some exemplary embodiments include methods (e.g., procedures) for signaling resynchronization signal (RSS) configurations of neighbor cells to one or more user equipment (UE). These exemplary methods can be performed by a network node (e.g., base station, eNB, gNB, etc., or component thereof) serving one or more user equipment (e.g., UE, wireless device, MTC device, NB-IoT device, modem, etc. or component thereof) in a cell of a wireless network.

These exemplary methods can include encoding a plurality of parameters of respective RSS configurations of one or more neighbor cells. For each particular neighbor cell, the encoded parameters (e.g., of the cell's RSS configuration) can include one or more RSS frequency locations and an RSS time offset for the particular neighbor cell.

These exemplary methods can also include transmitting, to the one or more UEs, at least a portion of the encoded parameters of the respective RSS configurations of the neighbor cells. In some embodiments, the transmitted encoded parameters can also include respective RSS power offsets relative to a reference signal (e.g., CRS).

For each particular neighbor cell, the encoding can be based on a bitmap and a parameter associated with the particular neighbor cell. In some embodiments, the parameters associated with the respective neighbor cells can be respective physical cell identifiers (PCIs).

In some embodiments, the encoding operations can include various sub-operations applied for each particular neighbor cell. In such embodiments, for each of a plurality of narrowbands comprising the particular neighbor cell's carrier bandwidth, the network node can determine whether the particular neighbor cell is transmitting RSS within the particular narrowband. In addition, the network node can encode the transmission determinations for the respective narrowbands in respective bits of a bitmap associated with the particular neighbor cell. In such embodiments, the bitmap is one of the encoded parameters.

In some of these embodiments, each narrowband can include a plurality of candidate RSS frequency locations. However, the encoded parameters, transmitted to the UEs, do not include indications of particular candidate RSS frequency locations used for transmitting RSS within the respective narrowbands. In other words, the encoded parameters indicate a narrowband with multiple candidate RSS frequency locations, but not a particular RSS frequency location within the narrowband, which the UE may determine and/or derive based on other information (e.g., the cell's PCI).

In some embodiments, encoding the respective RSS time offsets can be based on the respective parameters associated with the respective neighbor cells. However, in such embodiments, the transmitted encoded parameters do not include indications of the encoded RSS time offsets (e.g., the RSS time offsets are omitted entirely from the neighbor cell RSS configurations transmitted to the UE). In such embodiments, for example, the UE can instead determine respective RSS time offset based on the parameters associated with the respective neighbor cells (e.g., PCI).

In some embodiments, these exemplary methods can also include receiving a request, from a UE, for RSS configurations for neighbor cells. In such embodiments, the encoded parameters can be transmitted in response to the request. The requesting UE can be one of the UEs to which the encoded parameters are transmitted.

Other exemplary embodiments include methods (e.g., procedures) for receiving resynchronization signal (RSS) configurations of neighbor cells from a network node. These exemplary methods can be performed by a user equipment (UE, e.g., wireless device, MTC device, NB-IoT device, modem, etc. or component thereof) in communication with a network node (e.g., base station, eNB, gNB, etc., or components thereof) serving a cell in a wireless network (e.g., E-UTRAN, NG-RAN).

These exemplary methods can include receiving, from the network node, encoded parameters of respective RSS configurations of one or more neighbor cells. These exemplary methods can also include determining the respective RSS configurations of the neighbor cells based on the encoded parameters and on respective parameters associated with the respective neighbor cells. Furthermore, the RSS configuration, for each neighbor cell, can include one or more RSS frequency locations and an RSS time offset.

In some embodiments, the encoded parameters, for each neighbor cell, can include a bitmap indicating one or more RSS frequency locations. In such embodiments, the determining operations can include, for each particular neighbor cell and for each of a plurality of narrowbands comprising the particular neighbor cell's carrier bandwidth, determining whether the particular neighbor cell is transmitting RSS within the particular narrowband based on a corresponding bit in the bitmap associated with the particular neighbor cell.

In some of these embodiments, each narrowband can include a plurality of candidate RSS frequency locations. However, the encoded parameters, received from the network node, do not include indications of particular candidate RSS frequency locations used for transmitting RSS within the respective narrowbands. In other words, the encoded parameters can indicate a narrowband with multiple candidate RSS frequency locations, but not a particular RSS frequency location within the narrowband. In such embodiments, the determining operations can also include, for each particular neighbor cell and for each particular narrowband in which the particular neighbor cell is transmitting RSS, determining an RSS frequency location within the particular narrowband based on a parameter associated with the particular neighbor cell. For example, the parameters associated with the respective neighbor cells can be respective physical cell identifiers (PCIs).

In some embodiments, the respective RSS configurations of the neighbor cells can include respective RSS time offsets, but the encoded parameters received from the network node do not include indications of the respective time offsets (e.g., the RSS time offsets are omitted entirely from the neighbor cell RSS configurations transmitted to the UE). In such embodiments, the determining operations can also include determining the respective RSS time offsets based on the respective parameters associated with the respective neighbor cells (e.g., PCIs).

In some embodiments, the encoded parameters received from the network node can also include respective RSS power offsets relative to a reference signal.

In some embodiments, these exemplary methods can also include transmitting a request, to the network node, for RSS configurations for neighbor cells. In such embodiments, the encoded parameters can be received in response to the request.

Other exemplary embodiments include network nodes (e.g., base stations, eNBs, gNBs, CUs/DUs, etc. or components thereof) or user equipment (UEs, e.g., wireless devices, MTC devices, NB-IoT devices, etc. or components thereof) configured to perform operations corresponding to any of the exemplary methods described herein. Other exemplary embodiments include non-transitory, computer-readable media storing program instructions that, when executed by processing circuitry, configure such network nodes or UEs to perform operations corresponding to any of the exemplary methods described herein.

These and other objects, features, and advantages of the present disclosure will become apparent upon reading the following Detailed Description in view of the Drawings briefly described below.

BRIEF DESCRIPTION OF THE DRAWINGS

FIG. 5 shows an exemplary ASN.1 data structure defining an RSS configuration (called RSS-Config-r15), as specified by 3GPP TS 36.331

FIGS. 6-7 illustrate two exemplary techniques for signaling an RSS frequency location, according to various exemplary embodiments of the present disclosure.

FIGS. 18-21 are flow diagrams illustrating various exemplary methods implemented in a communication system, according to various exemplary embodiments of the present disclosure.

DETAILED DESCRIPTION

Figure 1:
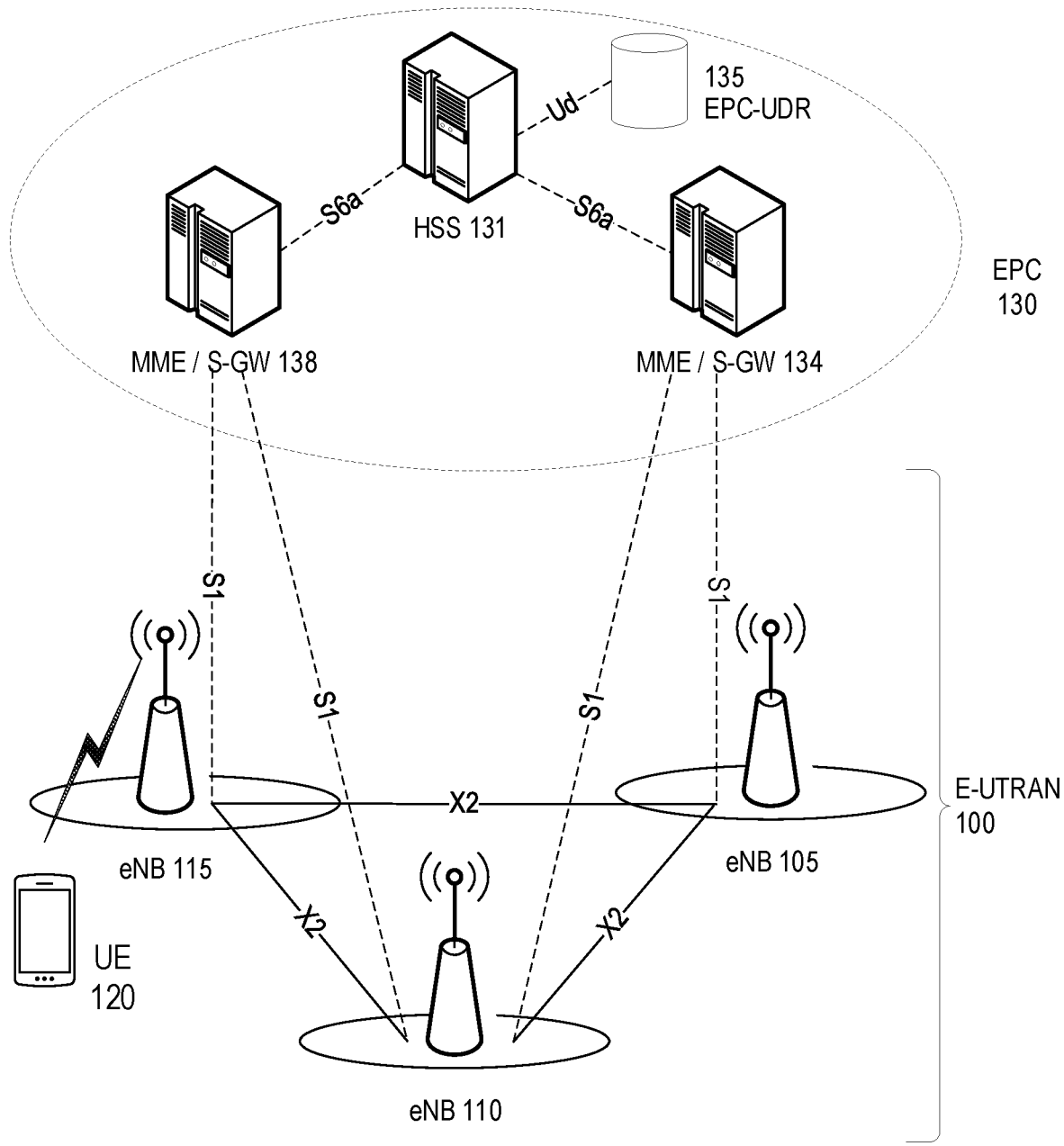
FIG. 1 is a high-level block diagram of an exemplary architecture of the Long-Term Evolution (LTE) Evolved UTRAN (E-UTRAN) and Evolved Packet Core (EPC) network, as standardized by 3GPP.
Figure 2A:
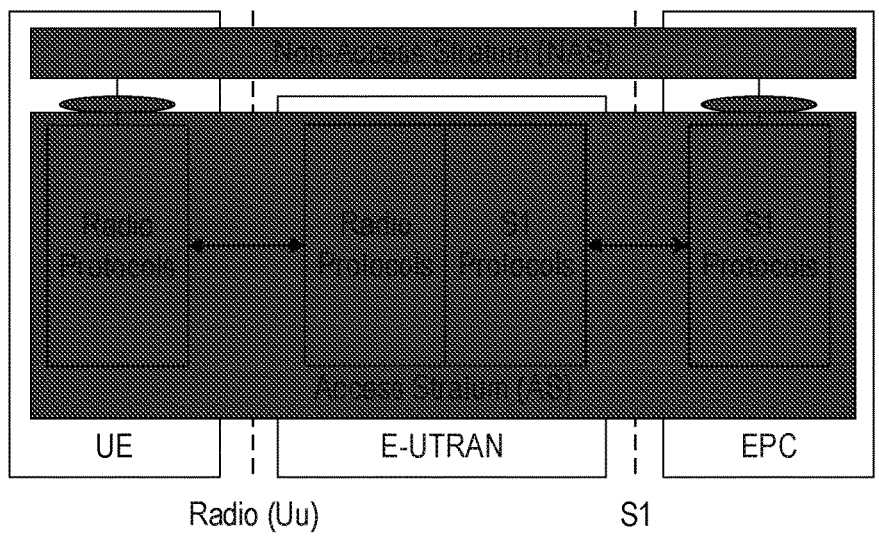
FIG. 2A is a high-level block diagram of an exemplary E-UTRAN architecture in terms of its constituent components, protocols, and interfaces.
Figure 2B:
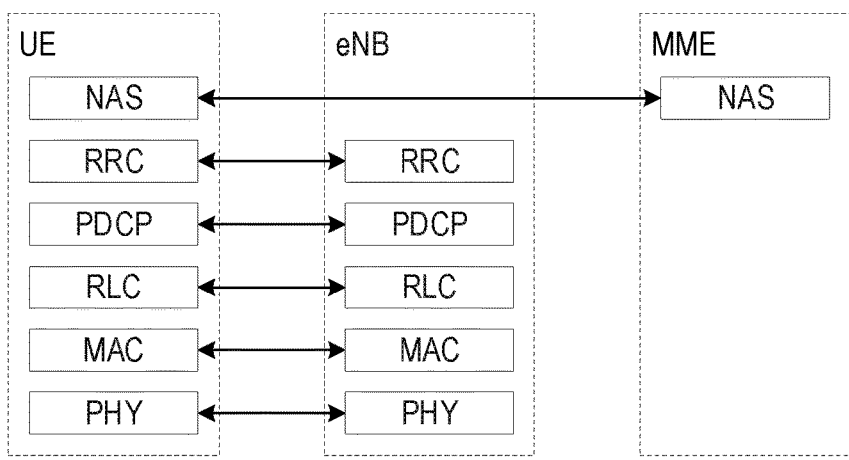
FIG. 2B is a block diagram of exemplary protocol layers of the control-plane portion of the radio (Uu) interface between a user equipment (UE) and the E-UTRAN.
Figure 2C:
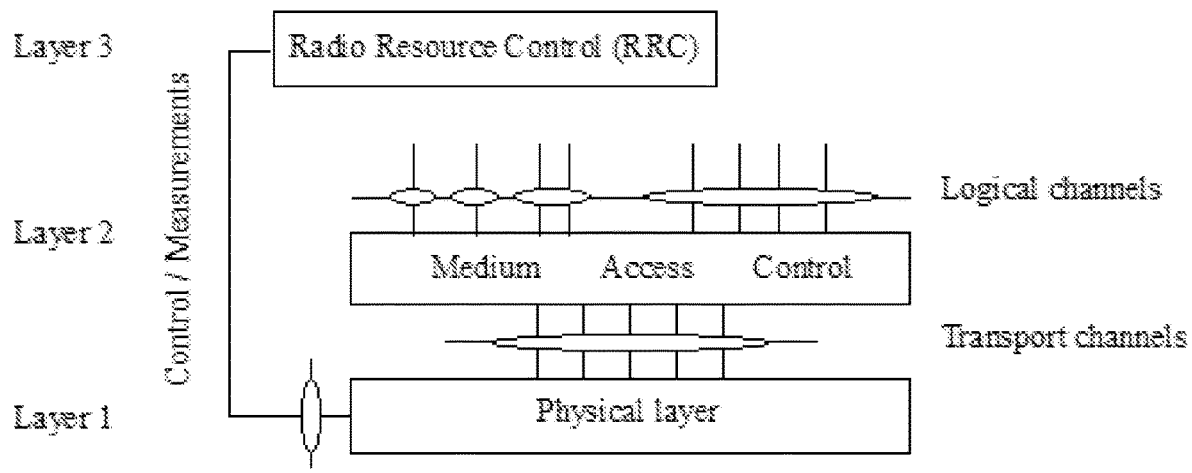
FIG. 2C is a block diagram of an exemplary LTE radio interface protocol architecture from the perspective of the PHY layer.
Figure 3A:
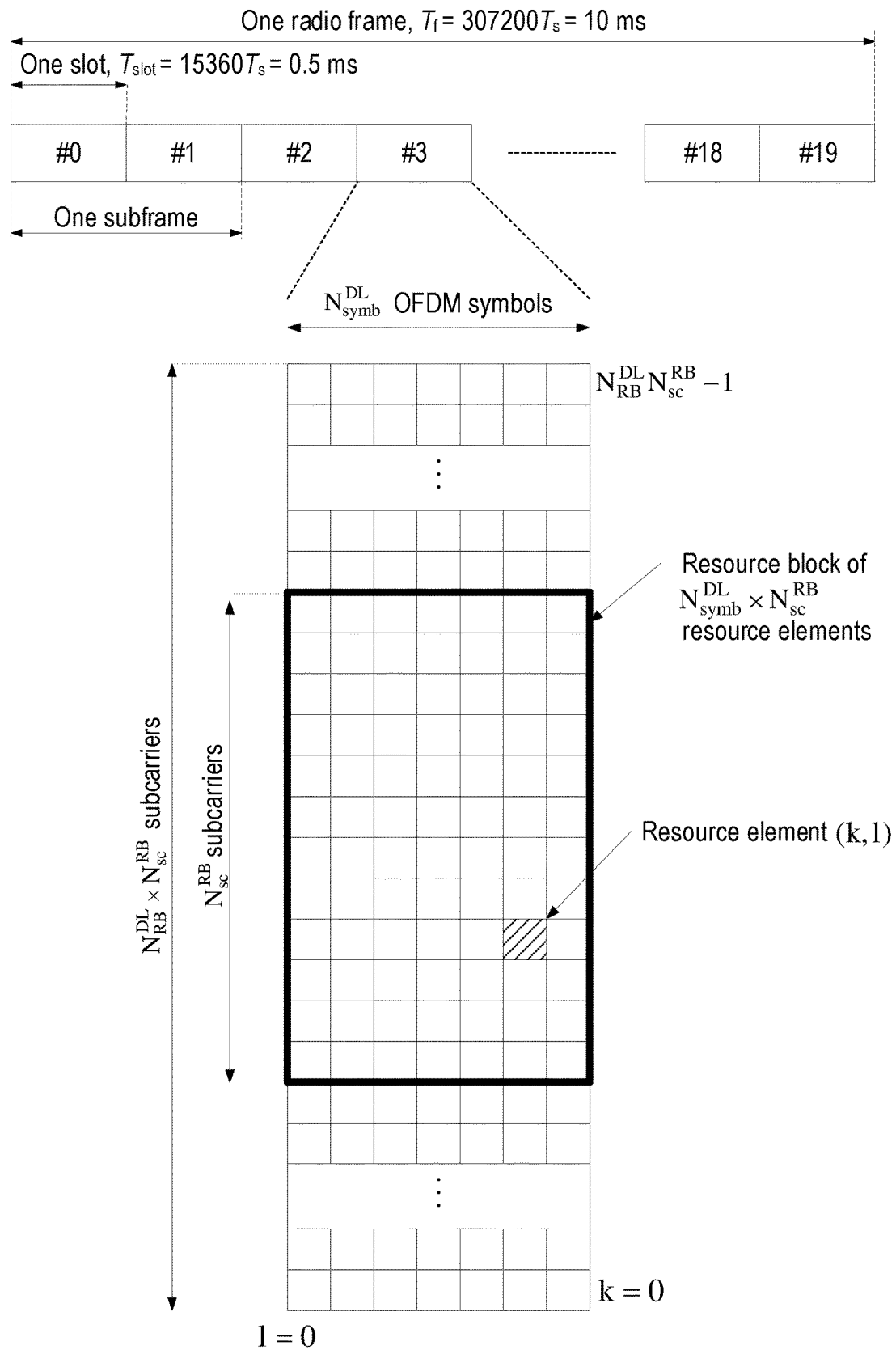
FIGS. 3A and 3B are block diagrams, respectively, of exemplary downlink and uplink LTE radio frame structures used for frequency division duplexing (FDD) operation.
Figure 3B:
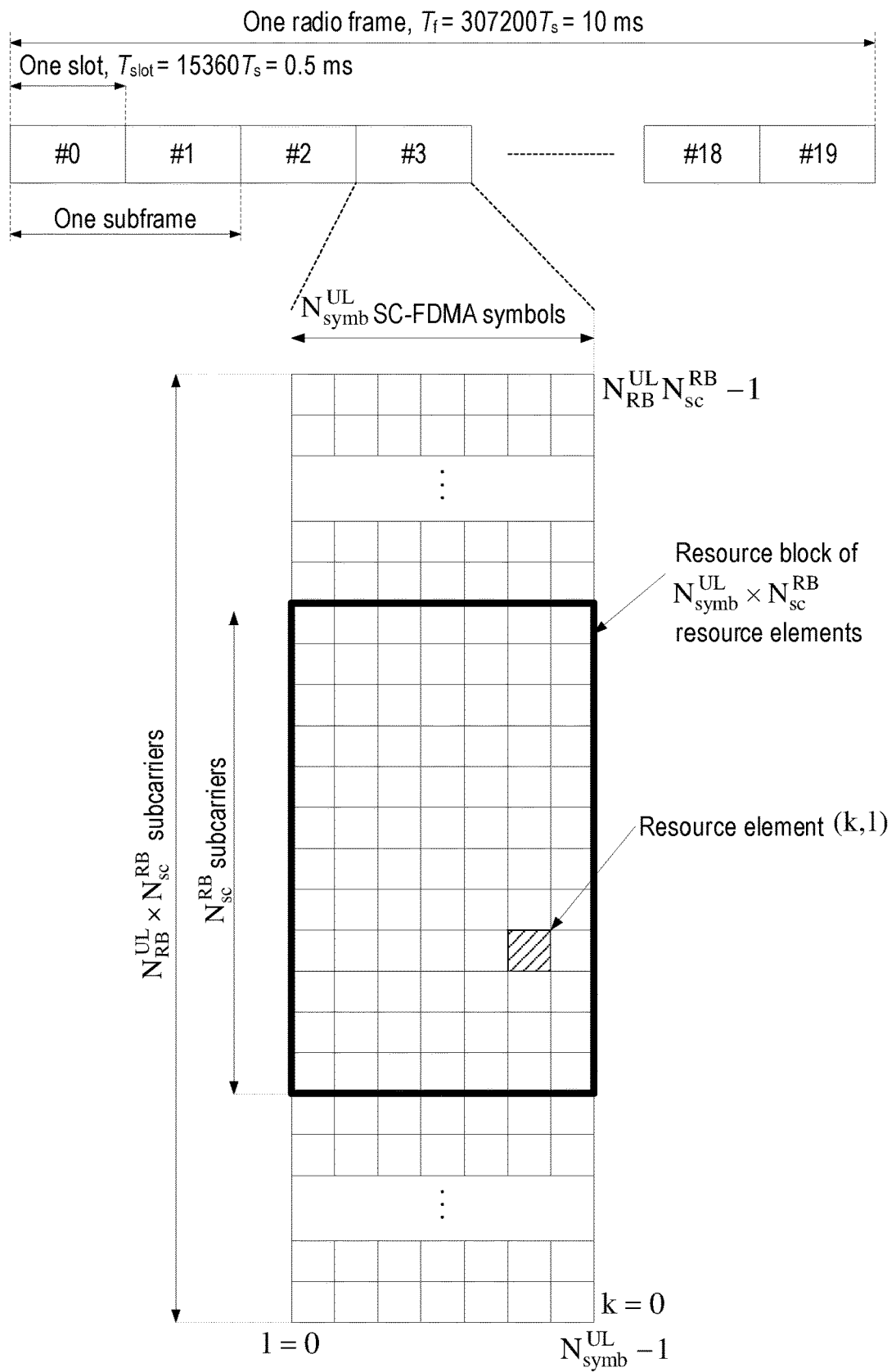

Some of the embodiments briefly summarized above will now be described more fully with reference to the accompanying drawings. These descriptions are provided by way of example to explain the subject matter to those skilled in the art, and should not be construed as limiting the scope of the subject matter to only the embodiments described herein. More specifically, examples are provided below that illustrate the operation of various embodiments according to the advantages discussed above.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods and/or procedures disclosed herein do not have to be performed in the exact order disclosed, unless a step is explicitly described as following or preceding another step and/or where it is implicit that a step must follow or precede another step. Any feature of any of the embodiments disclosed herein can be applied to any other embodiment, wherever appropriate. Likewise, any advantage of any of the embodiments can apply to any other embodiments, and vice versa. Other objectives, features and advantages of the enclosed embodiments will be apparent from the following description.

Furthermore, the following terms are used throughout the description given below:

Radio Node: As used herein, a "radio node" can be either a "radio access node" or a "wireless device."

Radio Access Node: As used herein, a "radio access node" (or equivalently "radio network node," "radio access network node," or "RAN node") can be any node in a radio access network (RAN) of a cellular communications network that operates to wirelessly transmit and/or receive signals. Some examples of a radio access node include, but are not limited to, a base station (e.g., a New Radio (NR) base station (gNB) in a 3GPP Fifth Generation (5G) NR network or an enhanced or evolved Node B (eNB) in a 3GPP LTE network), base station distributed components (e.g., CU and DU), a high-power or macro base station, a low-power base station (e.g., micro, pico, femto, or home base station, or the like), an integrated access backhaul (IAB) node, a transmission point, a remote radio unit (RRU or RRH), and a relay node.

Core Network Node: As used herein, a "core network node" is any type of node in a core network. Some examples of a core network node include, e.g., a Mobility Management Entity (MME), a serving gateway (SGW), a Packet Data Network Gateway (P-GW), an access and mobility management function (AMF), a session management function (AMF), a user plane function (UPF), a Service Capability Exposure Function (SCEF), or the like.

Wireless Device: As used herein, a "wireless device" (or "WD" for short) is any type of device that has access to (i.e., is served by) a cellular communications network by communicate wirelessly with network nodes and/or other wireless devices. Communicating wirelessly can involve transmitting and/or receiving wireless signals using electromagnetic waves, radio waves, infrared waves, and/or other types of signals suitable for conveying information through air. Unless otherwise noted, the term "wireless device" is used interchangeably herein with "user equipment" (or "UE" for short). Some examples of a wireless device include, but are not limited to, smart phones, mobile phones, cell phones, voice over IP (VoIP) phones, wireless local loop phones, desktop computers, personal digital assistants (PDAs), wireless cameras, gaming consoles or devices, music storage devices, playback appliances, wearable devices, wireless endpoints, mobile stations, tablets, laptops, laptop-embedded equipment (LEE), laptop-mounted equipment (LME), smart devices, wireless customer-premise equipment (CPE), mobile-type communication (MTC) devices, Internet-of-Things (IoT) devices, vehicle-mounted wireless terminal devices, etc.

Network Node: As used herein, a "network node" is any node that is either part of the radio access network (e.g., a radio access node or equivalent name discussed above) or of the core network (e.g., a core network node discussed above) of a cellular communications network. Functionally, a network node is equipment capable, configured, arranged, and/or operable to communicate directly or indirectly with a wireless device and/or with other network nodes or equipment in the cellular communications network, to enable and/or provide wireless access to the wireless device, and/or to perform other functions (e.g., administration) in the cellular communications network.

Signal: As used herein, a "signal" can be any physical signal or physical channel. Examples of physical signals are reference signal such as primary synchronization signal (PSS), secondary synchronization signal (SSS), channel state information RS (CSI-RS), demodulation RS (DM-RS), signals in SSB, cell reference signal (CRS), positioning reference signal (PRS), sounding reference signal (SRS), etc. The term physical channel used herein is also called as "channel", which contains higher layer information such as logical channel(s), transport channel(s), etc. Examples of physical channels include physical broadcast channel (PBCH), physical SL control channel (PSCCH), physical SL shared channel (PSSCH), physical DL control channel (PDCCH), physical DL shared channel (PDSCH), physical UL shared channel (PUSCH), physical UL control channel (PUCCH), random access channel (RACH), etc.

Resource: As used herein, a "resource" can correspond to any type of physical resource or radio resource expressed in terms of time. Examples of time resources include symbol, time slot, subframe, radio frame, TTI, interleaving time, etc.

Time-frequency resource: As used herein, a "time-frequency resource" can be any radio resource defined in any time-frequency resource grid (e.g., the exemplary NR resource grid shown in FIG. 5) associated with a cell. Examples of time-frequency resource include subcarrier, timeslot, resource block (RB), etc. An RB may also be interchangeably called as physical RB (PRB), virtual RB (VRB), etc.

Link: As used herein, "link" or "radio link" can correspond to a radio transmission path used for cellular operation or for any type of D2D operation between two endpoints (e.g., UEs or wireless devices). Examples of links used for cellular operations are links on Uu interface, uplink/reverse link (UE transmission to BS), downlink/forward link (BS transmission to UE), etc. Examples of links used for D2D operations are links on PC5, sidelink, etc.

Channel: As used herein, a "channel" can be a logical, transport, or physical channel (including exemplary physical channels listed above). A channel may comprise and/or be arranged on one or more carriers, in particular a plurality of subcarriers. A channel carrying and/or for carrying control signaling/control information may be considered a control channel (e.g., PDCCH), in particular if it is a physical layer channel and/or if it carries control plane information. Analogously, a channel carrying and/or for carrying data signaling/user information may be considered a data channel (e.g., PDSCH), in particular if it is a physical layer channel and/or if it carries user plane information. A channel may be defined for a specific communication direction, or for two complementary communication directions (e.g., UL and DL, or SL in two directions), in which case it may be considered to have two component channels, one for each direction.

Although terminology from one or more specific wireless systems (e.g., LTE) may be used herein, this should not limit the scope of the disclosure to only those specific wireless system(s). Other wireless systems, including Wide Band Code Division Multiple Access (WCDMA), Worldwide Interoperability for Microwave Access (WiMax), Ultra Mobile Broadband (UMB), and Global System for Mobile Communications (GSM), may also benefit from principles and/or embodiments of the present disclosure.

As a more specific example, while LTE was primarily designed for user-to-user communications, 5G (also referred to as "NR") cellular networks are envisioned to support both high single-user data rates (e.g., 1 Gb/s) and large-scale, machine-to-machine communication involving short, bursty transmissions from many different devices that share the frequency bandwidth. The 5G radio standards (also referred to as "New Radio" or "NR") are currently targeting a wide range of data services including eMBB (enhanced Mobile Broad Band), URLLC (Ultra-Reliable Low Latency Communication), and Machine-Type Communications (MTC). These services can have different requirements and objectives. For example, URLLC is intended to provide a data service with extremely strict error and latency requirements, e.g., error probabilities as low as $10^{-5}$ or lower and 1 ms end-to-end latency or lower. For eMBB, the requirements on latency and error probability can be less stringent whereas the required supported peak rate and/or spectral efficiency can be higher. In contrast, URLLC requires low latency and high reliability but with less strict data rate requirements.

Similar to LTE, NR uses CP-OFDM (Cyclic Prefix Orthogonal Frequency Division Multiplexing) in the downlink and both CP-OFDM and DFT-spread OFDM (DFT-S-OFDM) in the uplink. In the time domain, NR downlink and uplink physical resources are organized into equally-sized subframes of 1 ms each. A subframe is further divided into multiple slots of equal duration, with each slot including multiple OFDM-based symbols. To reduce latency, NR also supports transmission in mini-slots, which consist of any number of 1 to 14 OFDM symbols. NR also shares various other features of LTE that were discussed above.

As such, although embodiments are described in the context of LTE networks and features, skilled persons will recognize that underlying principles of such embodiments are equally applicable to corresponding 5G/NR networks and features. For example, although the term "cell" is used herein, it should be understood that 5G/NR beams may be used instead of cells and, as such, concepts described herein apply equally to both cells and beams.

In addition, functions and/or operations described herein as being performed by a wireless device or a network node may be distributed over a plurality of wireless devices and/or network nodes.

As briefly mentioned above, a new Resynchronization Signal (RSS) was introduced in LTE Rel-15 to facilitate easier and faster synchronization to the network after a UE wakes up during RRC_IDLE state. Even so, there are certain problems, issues, and/or drawbacks related to network signaling configurations of RSS to UEs, particularly to UEs in poor coverage areas. This is discussed in more detail below.

As also mentioned above, several enhancements to support Machine-to-Machine (M2M) and/or Internet of Things (IoT) related use cases were specified in 3GPP Rel-13 and Rel-14. There are many differences between "legacy" LTE and the procedures and channels specified for eMTC and for NB-IoT. These differences include newly defined physical channels, such as a new physical downlink control channels (called MPDCCH in eMTC and NPDCCH in NB-IoT) and a new physical random-access channel for NB-IoT (called NPRACH). These differences also include coverage level enhancements. By applying repetitions to the transmitted signals and channels, both eMTC and NB-IoT facilitate UE operation at a much lower signal-to-noise-ratio (SNR, also referred to as Es/Iot) compared to LTE. For example, eMTC and NB-IoT have an operating point of Es/Iot≥−15 dB while "legacy" LTE UEs can only operate down to −6 dB Es/IoT—a significant, 9-dB enhancement.

3GPP Rel-13 also included signaling reductions and/or improvements for both eMTC and NB-IoT. One improvement, known as "CIoT EPS UP optimization," allows the UE to resume a previously stored RRC connection (thus is also referred to as "RRC Suspend/Resume"). Another, known as "CIoT EPS CP optimization," allows the transmission of user-plane data over Non-Access Stratum (NAS) signaling, and is also referred to as "DoNAS."

In RRC_CONNECTED state, a UE monitors PDCCH for scheduled PDSCH/PUSCH and for other purposes. In LTE networks, depending on discontinuous reception (DRX) setting, a UE may spend a substantial part of its stored energy (e.g., in the UE's battery) on decoding PDCCH without detecting a PDSCH/PUSCH scheduled for it. Techniques that can reduce unnecessary PDCCH monitoring or allowing UE to go to sleep or wake-up only when required can be beneficial.

It is also desirable to reduce the UE's energy consumption in RRC_IDLE state, such as by allowing the UE to "sleep" for longer periods of time between waking up and looking for paging messages from the network (e.g., the UE's serving eNB). Nevertheless, increasing the duration of sleep periods also increases the likelihood that the UE will lose synchronization with its serving eNB while asleep, due to drifts in phase and frequency of the UE's internal reference oscillator (e.g., clock).

This can be particularly important for eMTC and NB-IoT UEs. To reduce the UE energy consumption in RRC_IDLE state, a Wake-up Signal (WUS) is introduced in Rel-15. A WUS is sent to a particular UE or a group of UEs, to indicate that the UE(s) read the paging channel(s) during a paging occasion associated with the WUS. A UE wakes up at a particular time to detect whether a WUS is directed to it. If the UE detects a relevant WUS, the UE remains awake to read the paging channel associated with the WUS; otherwise, the UE goes back to sleep until the next expected WUS. In this way, the UE reduces energy by only reading paging channels as required.

Nevertheless, increasing the duration of sleep periods also increases the likelihood that the UE will lose synchronization with its serving eNB while asleep, due to drifts in phase and frequency of the UE's internal reference oscillator (e.g., clock). The UE must regain synchronization once it awakens, and this "resynchronization" process can also consume a lot of energy, particularly if the UE wakes up in an area with poor coverage.

To facilitate easier and faster synchronization after wakeup, the new RSS was introduced in Rel-15. RSS facilitates UEs in poor coverage areas to achieve network synchronization, and also facilitates UEs in good coverage areas to achieve network synchronization more quickly than previous synchronization signals. These benefits are achieved by an RSS with significant synchronization energy over a short time interval.

Figure 4:
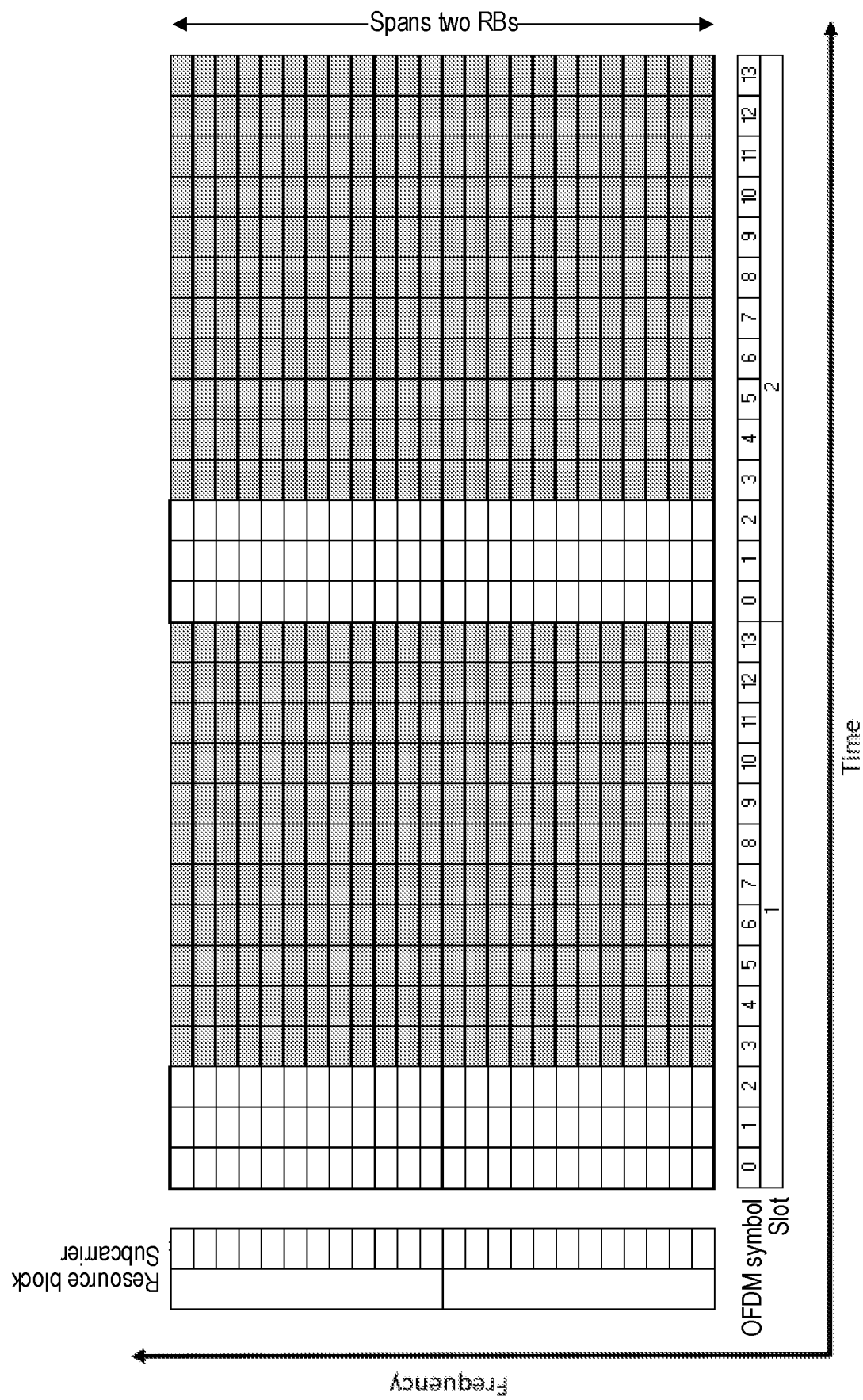
FIG. 4 shows a time-frequency grid of an exemplary resynchronization signal (RSS).

FIG. 4 shows a time-frequency grid of an exemplary RSS. As shown in FIG. 4, the RSS is allocated to and/or provided in two sets of 11 contiguous symbols in a subframe (indicated by shading), spanning two PRBs in the frequency domain. Both the duration and the periodicity of RSS are configurable. In particular, RSS can be configured with durations of 8-40 ms and with periods (or periodicities) of 160-1280 ms.

Currently, for Rel-16, there is a standardization work item (WI) referred to as "Additional MTC enhancements for LTE." One of the objectives of this WI is "Consider improving the DL RSRP [Reference Signal Received Power] and, if needed, RSRQ [Reference Signal Received Quality] measurement accuracy, through use of RSS." In general, each UE performs RSRP and/or RSRQ measurements not only on its serving cell, but also on one or more neighbor cells. As such, if the UE should perform RSS measurements on neighbor cells, it must be given an RSS configuration associated with each of those neighbor cells.

FIG. 5 shows an exemplary ASN.1 data structure defining an RSS configuration (called RSS-Config-r15), as specified by 3GPP TS 36.331. Table 1 below provides definitions and/or descriptions of various fields shown in the ASN.1 data structure of FIG. 5. Note that the "-r15" suffixes (indicating Rel-15) of the field names are omitted in Table 1 for conciseness.

TABLE 1

| Field name | Description |
| --- | --- |
| duration | Duration of RSS in subframes. Value sf8 corresponds to 8 subframes, value sf16 corresponds to 16 subframes, etc. |
| freqLocation | Frequency location (lowest PRB number) of RSS. |
| periodicity | Periodicity of RSS. Value ms160 corresponds to 160 ms, ms320 corresponds to 320 ms, etc. |
| powerBoost | Power offset of RSS relative to CRS in dB. Value dB0 corresponds to 0 dB, value dB3 corresponds to 3 dB, value dB4dot8 corresponds to 4.8 dB and so on |
| timeOffset | Time offset of RSS in frames. The actual value of time offset is based on the value of duration, as follows: For duration 160 ms, only value range 0 to 15 are applicable. Actual value = timeOffset * 1 frames. For duration 320 ms, actual value = timeOffset * 1 frames. For duration 640 ms, actual value = timeOffset * 2 frames. For duration 1280 ms, actual value = timeOffset * 4 frames. |

Table 2 below summarizes the RSS parameters that must be signaled to the UE for each cell to be measured, along with their respective sizes (in bits). If all parameters are signaled with full resolution also in neighboring cells, up to 18 bits are required for each neighboring cell to be measured, together with a nine-bit Cell-Id and a two-bit antenna port information for each cell. For typical UE measurements, RSS configuration for at least eight (8) cells would be required to be transmitted to the UE, resulting in a total of 8*(18+9+2)=242 bits. This will clearly add substantial network overhead, and thereby also result in reduced UE performance.

TABLE 2

| Parameter name | Description | Size (bits) |
| --- | --- | --- |
| ce-rss-periodicity-config | periodicity {160, 320, 640, 1280} ms | 2 |
| ce-rss-duration-config | duration {8, 16, 32, 40} subframes | 2 |
| ce-rss-freqPos-config | frequency location | 7 |
| ce-rss-timeOffset-config | time offset in number of radio frames | 5 |
| ce-rss-powerBoost-config | power offset relative to LTE CRS | 2 |

For example, UEs in poor coverage often require many repetitions of each RSS configuration message to correctly decode the message. As the size of the RSS configuration message increases, the number of repetitions can also increase, since the likelihood of an error in the message increases with the number of bits in the message, e.g., at a given channel condition. As such, larger messages tend to increase the UE energy consumption for receiving the message, particularly in poor coverage areas where multiple repetitions are required. Furthermore, repetitions will also occupy network resources, preventing such resources from being scheduled for other uses, e.g., other UEs. As such, it would be beneficial to have a more efficient method for signalling the RSS configurations that would reduce, mitigate, and/or minimize these problems and enable UEs to utilize RSS for various purposes without excessive energy consumption.

Accordingly, exemplary embodiments of the present disclosure provide novel, flexible, and efficient techniques for signaling neighbor cell RSS configurations to UEs for cell measurements. These techniques reduce the signaling overhead while maintaining a reasonable UE complexity for detecting RSS, which is particularly important for UEs in poor coverage. This increased efficiency can, in general, be achieved in various ways. In one group embodiments, redundant information is removed from the RSS configurations signaled to a UE for a group of neighbor cells. In another group of embodiments, the frequency location of the RSS for the respective neighbor cells is signaled to the UE in an efficient manner. Such embodiments can be used individually or in combination to reduce signaling overhead while maintaining a reasonable UE complexity. Exemplary benefits also include increased network signaling capacity available for other UEs and/or purposes, and reduced UE energy consumption in poor coverage areas.

In the first group of embodiments, a network node can determine a set of neighbor cells for which the network node should send RSS configurations to one or more UE. The network node can arrange the set of neighbor cells in a particular order. In some embodiments, the cell order can be arranged by increasing cell IDs. In other embodiments, the cell order can be the order in which the cell IDs are expected to be transmitted to (and received by) the one or more UEs.

Subsequently, the network node can determine a first configuration (e.g., a particular RSS configuration) relating to the set of neighbor cells. In some embodiments, the first configuration can be a default RSS configuration. In some embodiments, the first configuration can be the RSS configuration of the serving cell (e.g., the cell from which network node will provide the RSS configurations of the neighbor cells).

In some embodiments, the first configuration can be determined based on configurations associated with a first subset of the set of neighbor cells. For example, this can be done by quantizing and/or mapping the respective RSS configurations of the first subset to a first configuration that is substantially and/or approximately similar to the RSS configurations of the first subset. Furthermore, the first configuration is not necessarily identical to any of the RSS configurations of the first subset, but can be identical to one or more of them. In some embodiments, the network node can select the first subset, from the set, based on some degree and/or amount of likeness and/or similarity to the first configuration. In other words, the network node can select the first subset based on ability to quantize and/or map to the first configuration.

In some embodiments, the first configuration can include only a subset of the parameters associated with an RSS configuration, such as described above. For example, the first configuration can include a single RSS parameter, such as frequency location or time offset. In such embodiments, the remaining parameters of the respective RSS configurations of the first subset can retain their original values rather than being mapped and/or quantized.

Subsequently, the network node can encode the configurations associated with a first subset according to a first encoding method. In addition, the network node can encode the configurations associated with a second subset of the set of neighbor cells according to a second encoding method. For example, the second subset can be all neighbor cells of the set that are not included in the first subset. In other words, the second subset can be the cells whose RSS configurations cannot be mapped and/or quantized to be substantially and/or approximately similar to the first configuration.

Subsequently, the network node can transmit the encoded configurations of the set of neighbor cells to the one or more UEs. In other words, the network node can transmit the configurations of the first subset encoded according to the first encoding method, and the configurations of the second subset encoded according to the second encoding method. These configurations can be transmitted in a message, which can also include indications of whether the respective configurations in the message are encoded according to the first method or the second method.

In some embodiments, the second encoding method can be transparent, such that the RSS configurations of the second subset are transmitted without mapping and/or quantization, together with the respective cell IDs. In other embodiments, the second encoding method can be non-transparent, such that the RSS configurations of the second subset (or individual parameters thereof) can be quantized into values than can be represented by a smaller number of bits.

In some embodiments, the parameters comprising the RSS configurations can be transmitted in a predefined order, such that the transmitted message can include a set of bit lists in the order of the configuration parameters. For example, a bit list or bitmap can be provided for each configuration parameter, with each bit of a parameter bitmap associated with a particular neighbor cell. As a more specific example, each bit can indicate whether the parameter for that particular neighbor cell is encoded according to the first method or the second method.

In other embodiments, the cells can be transmitted in a predefined order, such that the transmitted message can include a set of bit lists in the order of the cells. For example, a bit list or bitmap can be provided for each neighbor cell, with each bit of a cell bitmap associated with a particular parameter comprising the RSS configurations. As a more specific example, each bit can indicate whether the corresponding parameter for that neighbor cell is encoded according to the first method or the second method. As another more specific example, each bit of a neighbor cell bitmap can apply to a portion of the range of the particular parameter (e.g., to a narrowband of the neighbor cell's carrier bandwidth).

In various embodiments, the first configuration that is used for mapping and/or quantizing the respective RSS configurations of the first subset can be determined in various ways. Furthermore, the parameter values comprising the first configuration (i.e., the values to which the individual parameters of the RSS configurations of the first subset are mapped) can be determined in various ways depending on the particular requirements, ranges, etc. of each parameter. Embodiments pertaining to different configuration parameters are discussed below.

In the second group of embodiments, the network node can determine a coded value of a frequency location of a signal (e.g., a RSS), where the signal bandwidth being smaller than a device bandwidth, that in turn is smaller than the neighbor cell's carrier bandwidth. Initially, the network node can partition the carrier bandwidth into sub-bandwidths. Next, the network node can determine in which of the sub-bandwidths that the signal is located. Subsequently, the network node can encode the determined sub-bandwidth as the signal's frequency location. Put a different way, the network can map and/or quantize the signal's frequency location to one of the sub-bandwidths. Upon receiving the frequency location encoded in this manner, a UE will decode the information to determine that the signal can be received in the indicated sub-bandwidth.

For example, for LTE RSS, the frequency location can be in any PRB of the carrier bandwidth except the highest PRB. Moreover, these embodiments are also applicable and beneficial if the network provides the frequency location information per carrier instead of per cell.

FIG. 6 illustrates an exemplary technique for signaling an RSS frequency location, according to various exemplary embodiments of the present disclosure. As shown in FIG. 6, the dark shaded region indicates the narrowband of possible RSS frequency locations that is signaled to the UE. In this example, each of the five possible RSS frequency locations (two even, three odd, all indicated by cross-hatching) within the narrowband are mapped and/or quantized to a single location associated with the entire narrowband. In this manner, a wider range of frequency locations are included in the first signal configuration to the expense of a reduction in frequency resolution. In such case, upon receiving and decoding the narrowband range for the RSS, the UE would need to detect the exact frequency location (e.g., which one of the five possible locations shown) is the actual RSS frequency location for the neighbor cell.

In some embodiments, an RSS located outside the narrowband can also be mapped to the narrowband but in other embodiments, such outliers would be indicated with a value corresponding to a non-existing narrowband. In some UE embodiments, the UE can first detect RSS in possible locations entirely within the narrowband, and if no RSS is found, the detect on possible locations that border the signaled narrowband (e.g., one PRB on either side). In the example shown in FIG. 6, this can include detecting on the top-most even RSS location, which falls partly outside of the signaled narrowband.

In some embodiment, the narrowband resolution is limited to what is needed to ascertain that the RSS completely falls within the UE bandwidth. Upon receiving and decoding the frequency location quantized in this manner, the UE will know approximately where the RSS is located, so that it may configure its receiver to span the RSS bandwidth, but within that bandwidth, the UE will need to detect the exact RSS location on its own.

FIG. 7 illustrates another exemplary technique for signaling an RSS frequency location, according to various exemplary embodiments of the present disclosure. As shown in FIG. 7, the dark shaded region indicates the narrowband of possible RSS frequency locations that is signaled to the UE. In this example, each of the three possible RSS frequency locations (two even, one odd) within the narrowband are mapped and/or quantized to a single location associated with the entire narrowband. Upon receiving and decoding the frequency location quantized in this manner, the UE can search five (5) frequency locations within the same receiver bandwidth or search area, since the RSS itself is two (2) PRBs wide. This is illustrated in FIG. 7 by the light shaded area. In this case, however, the actual RSS location (indicated by cross-hatching) is in the border between two receiver bandwidths, such that the UE will not detect RSS in the first, lower bandwidth and only detect it if the second, middle bandwidth overlaps the first with at least 1 PRB (or BW-1 PRBs for an arbitrary signal BW).

Accordingly, in some embodiments, to cover all possible RSS locations, a one-PRB overlap (for $BW_{RSS}=2$ or, more generally, a $BW_{RSS}-1$ overlap) can be added so that the UE is able to detect all RSS locations, even the overlapping ones. In such embodiments, the relation between the actual RSS frequency location, $f_{RSS}$, and the signaled neighboring cell RSS frequency location, $f_{RSS\_NC}$, can be determined based on:

$$f_{RSS\_NC} = \left\lfloor \frac{f_{RSS}}{5} \right\rfloor$$

or for the general case (expressed in PRBs), $$f_{RSS\_NC} = \left\lfloor \frac{f_{RSS}}{BW_{RX} - (BW_{RSS} - 1)} \right\rfloor$$

where $BW_{RX}$ and $BW_{RSS}$ is the receiver bandwidth and RSS bandwidth, respectively, and $\lfloor \cdot \rfloor$ indicates the floor rounding operation. Correspondingly, a UE that receives $f_{RSS\_NC}$, would need to search the following candidate $f_{RSS}$ locations for $BW_{RSS}=2$:

$$f_{RSS}=5f_{RSS\_NC}+k$$

where $k=[0 \ldots 4]$, or for the general case of $BW_{RSS}$ and receiver bandwidth $BW_{RX}$:

$$f_{RSS}=(BW_{RX}-(BW_{RSS}-1))f_{RSS\_NC}+k$$

in which case $k=[0 \ldots (BW_{RX}-BW_{RSS})]$.

In some embodiments, having received the coded frequency location, the UE uses hypothesis testing for determining the exact frequency location of the signal by searching all possible signal locations. In some embodiments, a further restriction can be imposed on the coded value such that it may further reduce the resolution of the location such that a signaled value indicates a number of subbands, one of which includes the signal.

In a variant related to the second group of embodiments, the network node can determine a coded value of a time offset of a periodic signal, the time offset being one of a number of values smaller than the signal period. Initially, the network node can determine the signal periodicity. Next, the network node can compare the time offset is compared to a fraction of the signal periodicity, e.g., 1%. Subsequently, the network node can encode the time offset such that if the time offset is less than (or equal to) the fraction of the signal periodicity, then the value is coded as aligned, otherwise the value is coded as misaligned. Upon receiving the time offset encoded in this manner, a UE can hypothesize between the different allowed time offsets that are possible within the defined fraction to determine the actual time offset (e.g., of the RSS for the neighbor cell).

In some embodiments, the time offset comparison can be the difference between the time offset of a neighbor cell RSS configuration for the UE, and the time offset of a neighbor cell RSS configuration for another UE. In another embodiment, the time offset comparison can be with an absolute offset, such that the time offset can be aligned if the UE and other UE are located within the same fraction of the absolute time offset (e.g., within a single frame or the same frame offset).

In other embodiments, the time offset can be omitted entirely from the neighbor cell RSS configurations signaled to the UE. In these embodiments, the UE can instead determine RSS time offset based on some function of physical cell ID (PCI) associated with the neighbor cell. One exemplary function is:

Time offset=abs(mod(PCI,32)) or

Time offset=abs(mod(PCI,16)) for duration 160 ms, where the PCI is defined in 3GPP TS 36.331 as an integer between 0 and 503. Skilled persons will readily comprehend that other RSS configuration parameters (e.g., frequency location) can be based on a function of PCI or, more generally, on a function of a parameter having different values associated with the respective neighbor cells. For example, such techniques can be used to indicate the particular frequency location in a narrowband, such that the UE would not need to detect the exact RSS frequency location within the narrowband by hypothesis testing, as discussed above.

In other embodiments, the RSS transmitted by the neighbor cells can be configured to have fixed, known, and/or preconfigured respective time offsets relative to the RSS transmitted by the UE's serving cell. In such embodiments, the network node can order the RSS configurations for the neighbor cells (also referred to as "neighbor list") in the message sent to the UE in an order based on the respective time offsets. In this manner, upon receiving the message comprising the neighbor list, the UE can derive the neighbor cell time offsets based upon the neighbor list order and serving cell time offset.

For example, if there are Y cells in the neighbor cell list, the UE can determine the offset for each neighbor cell i in the list based upon the assumption of a time offset reuse factor of R (e.g., R=Y). This can be done according to the following exemplary procedure:

1. Determine an offset value, e.g., offset=floor (Max value/Y)
2. Initialize a temporary offset (tempOffset) equal to serving cell timeOffset;
3. Assign a timeOffset value to each neighbor cell i, update tempOffset according to:

timeOffset($i$)=offset+tempOffset tempOffset=timeOffset($i$),

Repeat 3 while i≠n && tempOffset<31;
4. If tempOffset>31, reset tempOffset=0 and go to 3.

Figure 8:
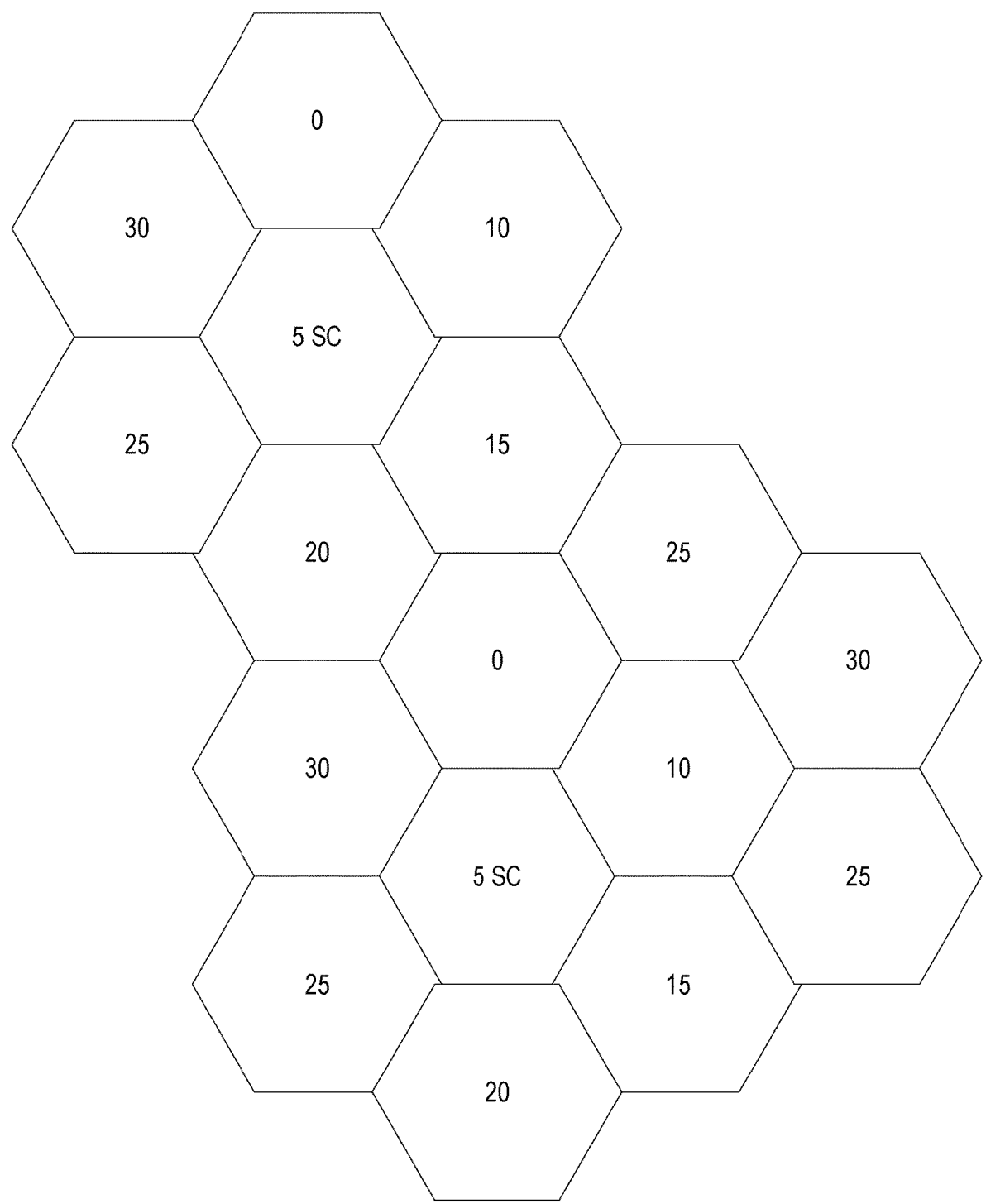
FIG. 8 illustrates a high-level view of a pattern of cells with associated RSS time offsets, according to various exemplary embodiments of the present disclosure.

FIG. 8 illustrates a high-level view of a pattern of cells with associated RSS time offsets, according to various exemplary embodiments of the present disclosure. In the example shown in FIG. 8, the serving cell (SC) timeOffset=5 and the number of cells (Y) in the neighbor cell list=6. According to the above procedure, offset=floor (31/6)=5, and the six neighbor-cell timeOffset(i) can be determined as {10, 15, 20, 25, 30, 0}. The respective time offsets are shown in the centers of the corresponding neighbor cells in FIG. 8.

In some embodiments, the neighbor cell RSS configurations encoded according to any of the above embodiments can be transmitted using broadcast signaling in the serving cell, e.g., in a system information block (SIB). In other embodiments, the neighbor cell RSS configurations encoded according to any of the above embodiments can be transmitted using dedicated signaling between the network and the UE. In addition to avoiding capacity limitations of broadcast signaling, using dedicated signaling also enables the network to target the RSS configurations to only those UEs that are in need of RSS, e.g., UEs that follow an eDRX cycle.

In other embodiments, the network can select the UEs to receive RSS configurations based on UE battery source indication. This feature is defined in 3GPP TS 23.682 (v15.5.0) section 5.10.1 and identifies power consumption criticality for the UE according to different categories, e.g., if the UE is battery powered with not rechargeable/not replaceable battery, battery powered with rechargeable/replaceable battery, or not battery powered. For example, based on the battery source indication, the network can select the most power efficient signaling for battery powered UEs that are not rechargeable.

Figures 9, 10:
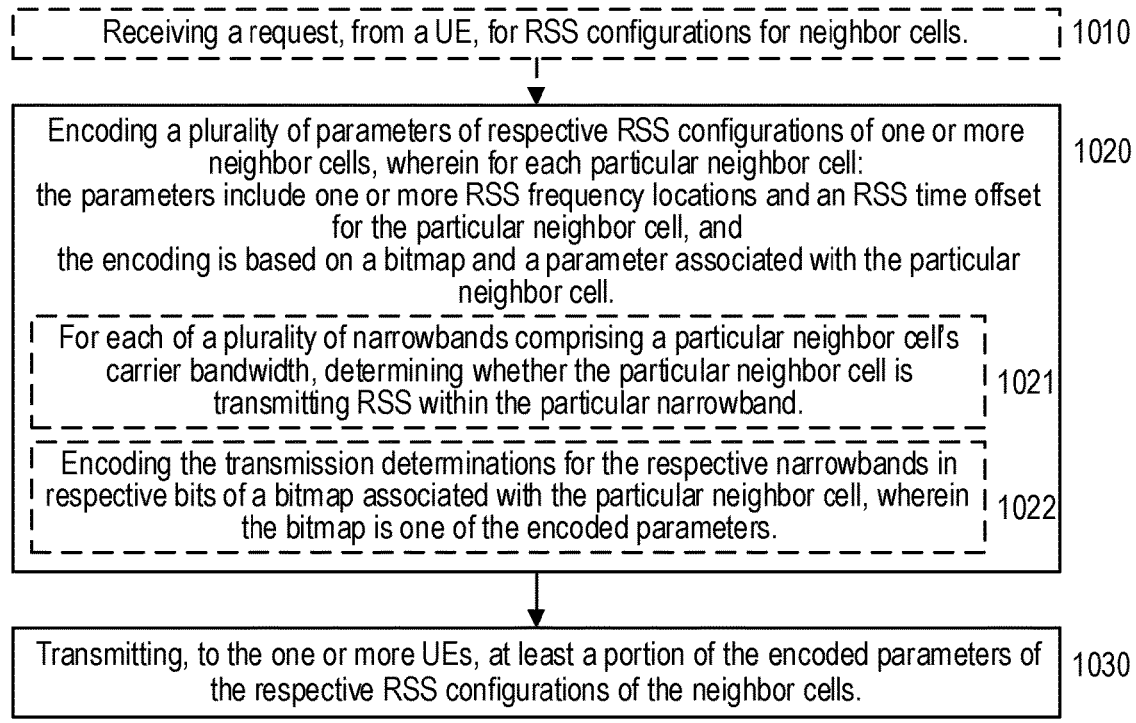
FIG. 9 shows an exemplary ASN.1 data structure defining an EstablishmentCause that can be included in an RRCConnectionRequest message, according to various exemplary embodiments of the present disclosure.
FIG. 10 is a flow diagram illustrating an exemplary method (e.g., procedure) performed by a network node (e.g., base station, eNB, gNB, etc., or component thereof), according to various exemplary embodiments of the present disclosure.

In other embodiments, the UE can send a message to the network requesting the RSS configurations for the neighbor cells. For example, the UE can send an RRC Connection Request that includes a flag and/or cause value that both the UE and network recognize as indicating a request for RSS configurations. FIG. 9 shows an exemplary ASN.1 data structure defining an EstablishmentCause that can be included in an RRCConnectionRequest message, in accordance with these embodiments.

The embodiments described above can be further illustrated with reference to FIGS. 10-11, which depict exemplary methods (e.g., procedures) performed by network nodes and UEs, respectively. Put differently, various features of the operations described below correspond to various embodiments described above.

FIG. 10 shows a flow diagram of an exemplary method (e.g., procedure) for signaling resynchronization signal (RSS) configurations of neighbor cells to one or more user equipment (UE), according to various exemplary embodiments of the present disclosure. The exemplary method can be performed by a network node (e.g., base station, eNB, gNB, etc., or component thereof) serving one or more user equipment (UEs, e.g., wireless devices, MTC devices, NB-IoT devices, modems, etc. or components thereof) in a cell of a wireless network (e.g., E-UTRAN, NG-RAN). For example, the exemplary method shown in FIG. 10 can be implemented in a network node configured according to other figures described herein. Furthermore, the exemplary method shown in FIG. 10 can be used cooperatively with other exemplary methods described herein to provide various exemplary benefits described herein. Although FIG. 10 shows specific blocks in a particular order, the operations of the exemplary method can be performed in a different order than shown and can be combined and/or divided into blocks having different functionality than shown. Optional blocks or operations are indicated by dashed lines.

The exemplary method can include the operations of block 1020, where the network node can encode a plurality of parameters of respective RSS configurations of one or more neighbor cells. For each particular neighbor cell, the encoded parameters (e.g., of the cell's RSS configuration) can include one or more RSS frequency locations and an RSS time offset for the particular neighbor cell.

The exemplary method can also include the operations of block 1030, where the network node can transmit, to the one or more UEs, at least a portion of the encoded parameters of the respective RSS configurations of the neighbor cells. In some embodiments, the transmitted encoded parameters can also include respective RSS power offsets relative to a reference signal (e.g., CRS).

For each particular neighbor cell, the encoding can be based on a bitmap and a parameter associated with the particular neighbor cell. In some embodiments, the parameters associated with the respective neighbor cells can be respective physical cell identifiers (PCIs).

In some embodiments, the encoding operations of block 1020 can include the operations of sub-blocks 1021-1022, which can be applied for each particular neighbor cell. In sub-block 1021, the network node can, for each of a plurality of narrowbands comprising the particular neighbor cell's carrier bandwidth, determine whether the particular neighbor cell is transmitting RSS within the particular narrowband. In sub-block 1022, the network node can encode the transmission determinations for the respective narrowbands in respective bits of a bitmap associated with the particular neighbor cell. In such embodiments, the bitmap is one of the encoded parameters.

In some of these embodiments (e.g., including sub-blocks 1021-1022), each narrowband can include a plurality of candidate RSS frequency locations. However, the encoded parameters, transmitted to the UEs, do not include indications of particular candidate RSS frequency locations used for transmitting RSS within the respective narrowbands. In other words, the encoded parameters indicate a narrowband with multiple candidate RSS frequency locations, but not a particular RSS frequency location within the narrowband, which the UE may determine and/or derive based on other information. As an example, in some embodiments, for each particular neighbor cell, the particular candidate RSS frequency locations used for transmitting RSS within the respective narrowbands are related to the parameter associated with the particular neighbor cell (e.g., the cell's PCI).

In some embodiments, encoding the respective RSS time offsets (e.g., in block 1020) can be based on the respective parameters associated with the respective neighbor cells. However, in such embodiments, the transmitted encoded parameters do not include indications of the encoded RSS time offsets. In other words, as described above, the RSS time offsets can be omitted entirely from the neighbor cell RSS configurations signaled to the UE. In such embodiments, for example, the UE can instead determine RSS time offset based on some function of PCI associated with each neighbor cell.

In some embodiments, the exemplary method can also include the operations of block 1010, where the network node can receive a request, from a UE, for RSS configurations for neighbor cells. In such embodiments, the encoded parameters can be transmitted (e.g., in block 1030) in response to the request. The requesting UE can be one of the UEs to which the encoded parameters are transmitted. Moreover, the neighbor cells identified in the request can be the same as or different from (e.g., subset or superset) of the one or more neighbor cells for which the encoded parameters are transmitted.

Figure 11:
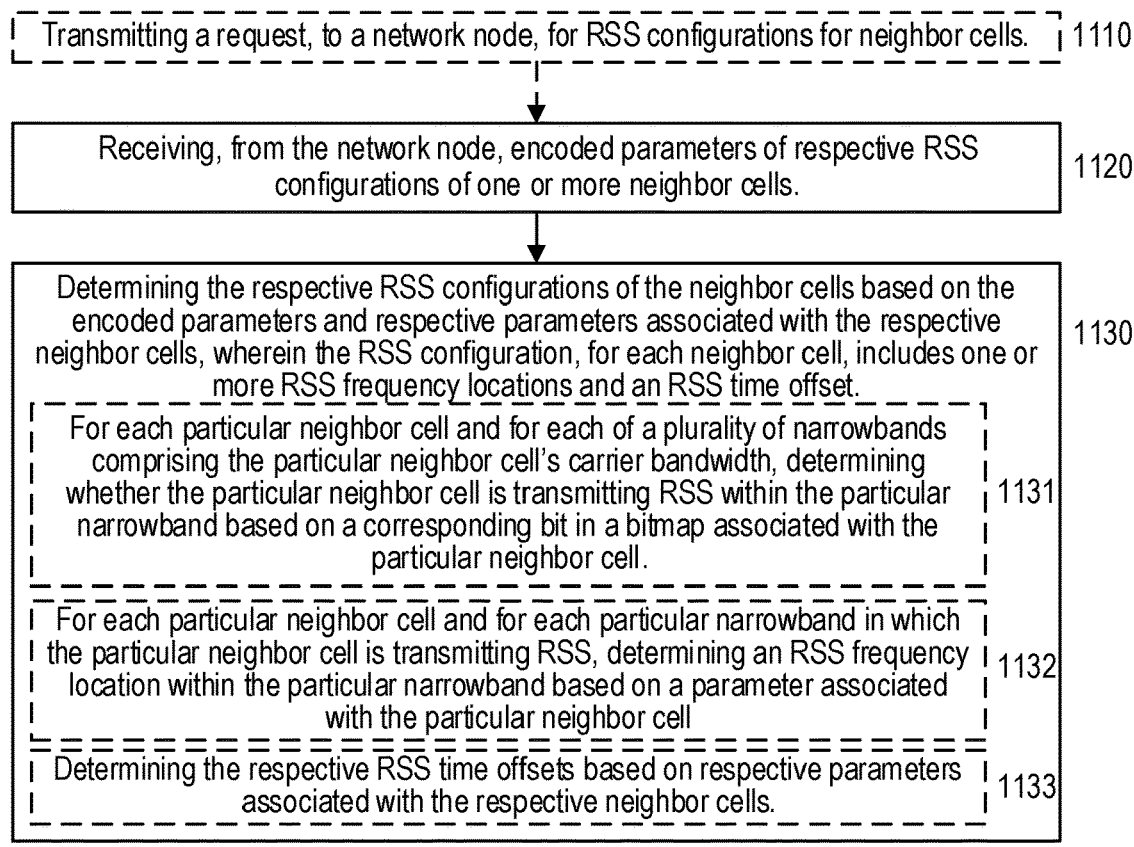
FIG. 11 is a flow diagram illustrating an exemplary method (e.g., procedure) performed by a user equipment (UE, e.g., wireless device, MTC device, NB-IoT device, modem, etc. or component thereof), according to various exemplary embodiments of the present disclosure

In addition, FIG. 11 shows a flow diagram of an exemplary method (e.g., procedure) for receiving resynchronization signal (RSS) configurations of neighbor cells, according to various exemplary embodiments of the present disclosure. The exemplary method can be performed by a user equipment (UE, e.g., wireless device, MTC device, NB-IoT device, modem, etc. or component thereof) in communication with a network node (e.g., base station, eNB, gNB, etc., or components thereof) serving a cell in a wireless network (e.g., E-UTRAN, NG-RAN). For example, the exemplary method shown in FIG. 11 can be implemented in a UE configured according to other figures described herein. Furthermore, the exemplary method shown in FIG. 11 can be used cooperatively with other exemplary methods described herein to provide various exemplary benefits described herein. Although FIG. 11 shows specific blocks in a particular order, the operations of the exemplary method can be performed in a different order than shown and can be combined and/or divided into blocks having different functionality than shown. Optional blocks or operations are indicated by dashed lines.

The exemplary method can include the operations of block 1120, where the UE can receive, from the network node, encoded parameters of respective RSS configurations of one or more neighbor cells. The exemplary method can also include the operations of block 1130, where the UE can determine the respective RSS configurations of the neighbor cells based on the encoded parameters and on respective parameters associated with the respective neighbor cells. Furthermore, the RSS configuration, for each neighbor cell, can include one or more RSS frequency locations and an RSS time offset.

In some embodiments, the encoded parameters, for each neighbor cell, can include a bitmap indicating one or more RSS frequency locations. In such embodiments, the determining operations of block 1130 can include the operations of sub-block 1131, where the UE can, for each particular neighbor cell and for each of a plurality of narrowbands comprising the particular neighbor cell's carrier bandwidth, determine whether the particular neighbor cell is transmitting RSS within the particular narrowband based on a corresponding bit in the bitmap associated with the particular neighbor cell.

In some of these embodiments (e.g., including the bitmap), each narrowband can include a plurality of candidate RSS frequency locations. However, the encoded parameters, received from the network node, do not include indications of particular candidate RSS frequency locations used for transmitting RSS within the respective narrowbands. In other words, the encoded parameters indicate a narrowband with multiple candidate RSS frequency locations, but not a particular RSS frequency location within the narrowband. In such embodiments, the determining operations can also include the operations of sub-block 1132, where the UE can, for each particular neighbor cell and for each particular narrowband in which the particular neighbor cell is transmitting RSS, determine an RSS frequency location within the particular narrowband based on a parameter associated with the particular neighbor cell. For example, the parameters associated with the respective neighbor cells are respective physical cell identifiers (PCIs).

In some embodiments, the respective RSS configurations of the neighbor cells include respective RSS time offsets, but the encoded parameters received from the network node (e.g., in block 1120) do not include indications of the respective time offsets. In such embodiments, the determining operations of block 1130 can also include the operations of sub-block 1133, where the network node can determine the respective RSS time offsets based on respective parameters associated with the respective neighbor cells. In other words, as described above, the RSS time offsets can be omitted entirely from the neighbor cell RSS configurations signaled to the UE. In such embodiments, for example, the UE can determine RSS time offset based on some function of PCI associated with each neighbor cell.

In some embodiments, the encoded parameters received from the network node (e.g., in block 1120) also include respective RSS power offsets relative to a reference signal.

In some embodiments, the exemplary method can also include the operations of block 1110, where the UE can transmit a request, to the network node, for RSS configurations for neighbor cells. In such embodiments, the encoded parameters can be received (e.g., in block 1120) in response to the request. The neighbor cells identified in the request can be the same as or different from (e.g., subset or superset) of the one or more neighbor cells for which the encoded parameters are received.

Figure 12:
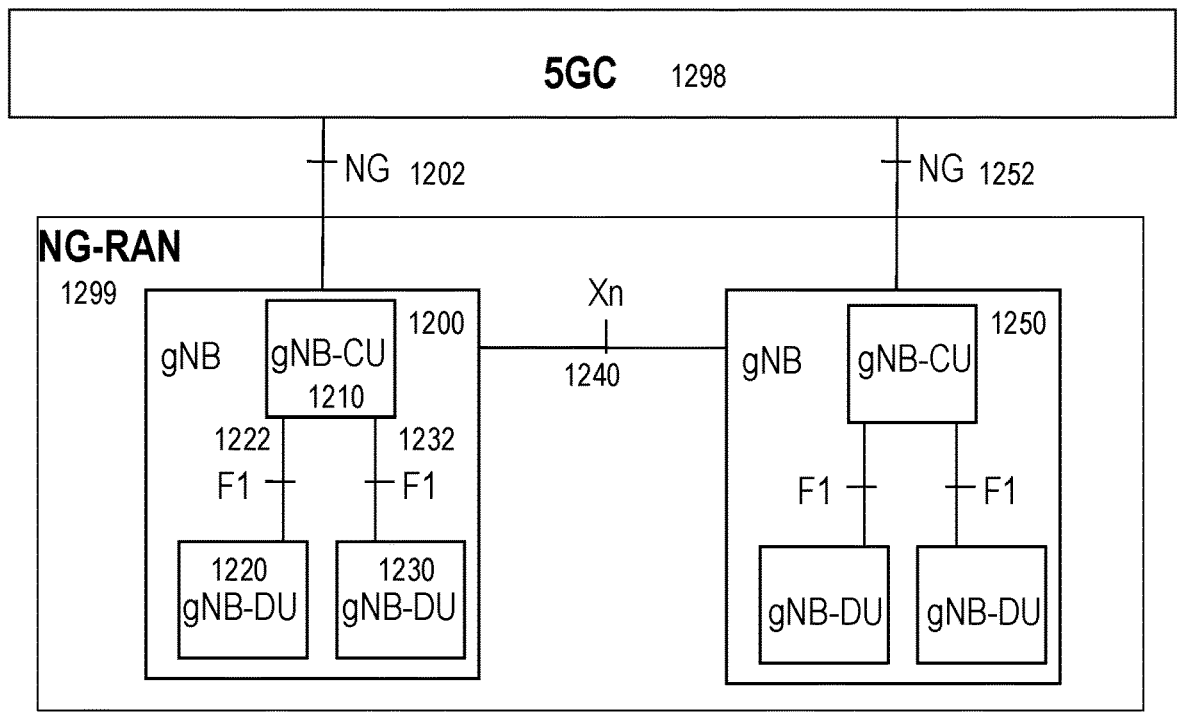
FIG. 12 illustrates a high-level view of an exemplary 5G network architecture.
Figure 13:
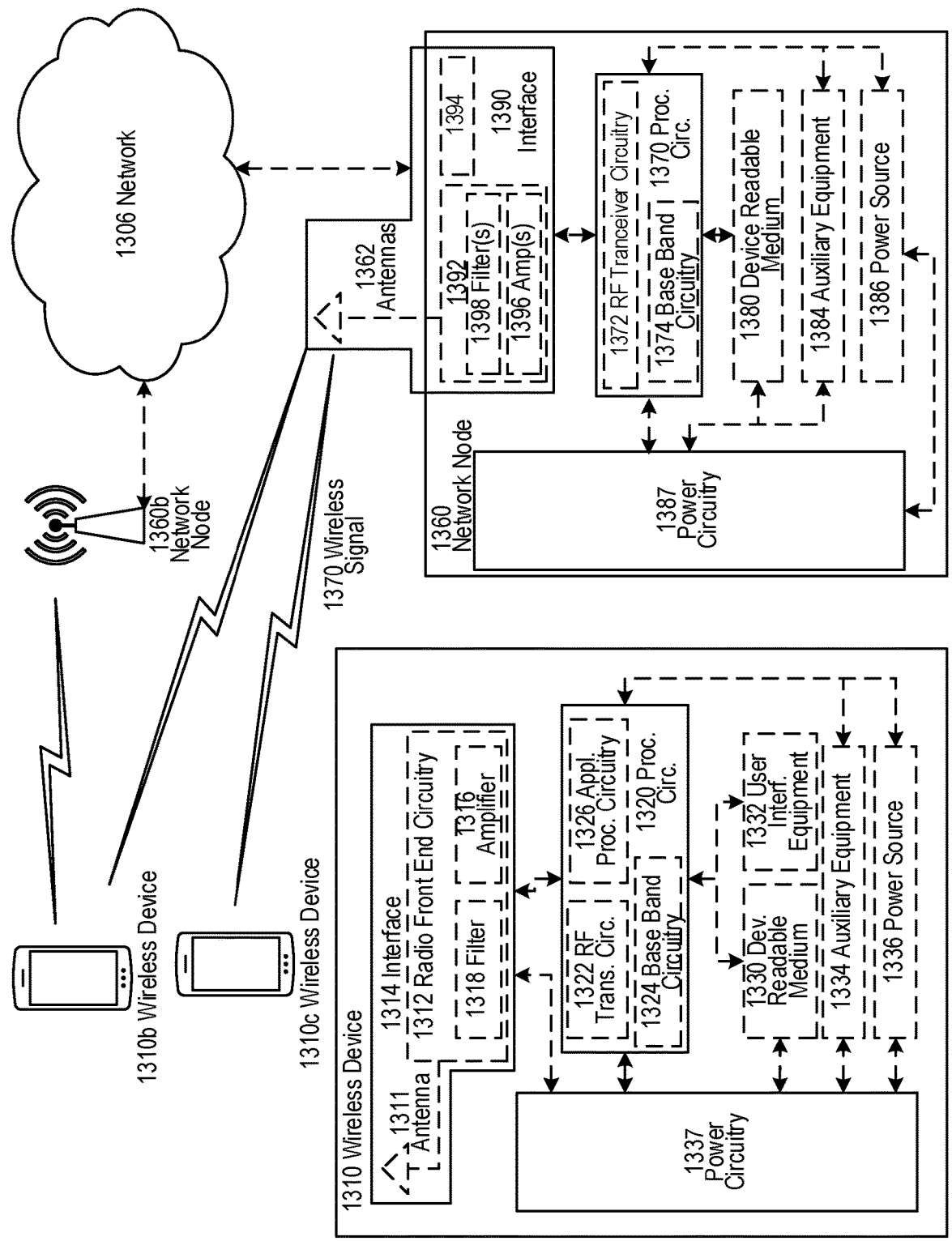
FIG. 13 illustrates an exemplary embodiment of a wireless network, in accordance with various aspects described herein.

Although the subject matter described herein can be implemented in any appropriate type of system using any suitable components, the embodiments disclosed herein are described in relation to a wireless network, such as the example wireless networks illustrated in FIGS. 12-13.

FIG. 12 illustrates a high-level view of an exemplary 5G network architecture, including a Next Generation RAN (NG-RAN) 1299 and a 5G Core (5GC) 1298. NG-RAN 1299 can include a set of gNodeB's (gNBs) connected to the 5GC via one or more NG interfaces, such as gNBs 1200, 1250 connected via interfaces 1202, 1252, respectively. In addition, the gNBs can be connected to each other via one or more Xn interfaces, such as Xn interface 1240 between gNBs 1200 and 1250. With respect to the NR interface to UEs, each of the gNBs can support frequency division duplexing (FDD), time division duplexing (TDD), or a combination thereof.

The NG RAN logical nodes shown in FIG. 12 (and described in 3GPP TS 38.401 and 3GPP TR 38.801) include a central (or centralized) unit (CU or gNB-CU) and one or more distributed (or decentralized) units (DU or gNB-DU). For example, gNB 1200 in FIG. 12 includes gNB-CU 1210 and gNB-DUs 1220 and 1230. CUs (e.g., gNB-CU 1210) are logical nodes that host higher-layer protocols and perform various gNB functions such controlling the operation of DUs. Each DU is a logical node that hosts lower-layer protocols and can include, depending on the functional split, various subsets of the gNB functions. As such, each of the CUs and DUs can include various circuitry needed to perform their respective functions, including processing circuitry, transceiver circuitry (e.g., for communication), and power supply circuitry. Moreover, the terms "central unit" and "centralized unit" are used interchangeably herein, as are the terms "distributed unit" and "decentralized unit."

A gNB-CU connects to gNB-DUs over respective F1 logical interfaces, such as interfaces 1222 and 1232 shown in FIG. 12. The gNB-CU and connected gNB-DUs are only visible to other gNBs and the 5GC as a gNB, e.g., the F1 interface is not visible beyond gNB-CU. As briefly mentioned above, a CU can host higher-layer protocols such as, e.g., F1 application part protocol (F1-AP), Stream Control Transmission Protocol (SCTP), GPRS Tunneling Protocol (GTP), Packet Data Convergence Protocol (PDCP), User Datagram Protocol (UDP), Internet Protocol (IP), and Radio Resource Control (RRC) protocol. In contrast, a DU can host lower-layer protocols such as, e.g., Radio Link Control (RLC), Medium Access Control (MAC), and physical-layer (PHY) protocols.

Other variants of protocol distributions between CU and DU can exist, however, such as hosting the RRC, PDCP and part of the RLC protocol in the CU (e.g., Automatic Retransmission Request (ARQ) function), while hosting the remaining parts of the RLC protocol in the DU, together with MAC and PHY. In some embodiments, the CU can host RRC and PDCP, where PDCP is assumed to handle both UP traffic and CP traffic. Nevertheless, other exemplary embodiments may utilize other protocol splits that by hosting certain protocols in the CU and certain others in the DU. Exemplary embodiments can also locate centralized control plane protocols (e.g., PDCP-C and RRC) in a different CU with respect to the centralized user plane protocols (e.g., PDCP-U).

For simplicity's sake, the exemplary wireless network shown FIG. 13 only depicts network 1306, network nodes 1360 and 1360b, and WDs 1310, 1310b, and 1310c. In practice, a wireless network can further include any additional elements suitable to support communication between wireless devices or between a wireless device and another communication device, such as a landline telephone, a service provider, or any other network node or end device. Of the illustrated components, network node 1360 and wireless device (WD) 1310 are depicted with additional detail. The wireless network can provide communication and other types of services to one or more wireless devices to facilitate the wireless devices' access to and/or use of the services provided by, or via, the wireless network.

The wireless network can comprise and/or interface with any type of communication, telecommunication, data, cellular, and/or radio network or other similar type of system. In some embodiments, the wireless network can be configured to operate according to specific standards or other types of predefined rules or procedures. Thus, particular embodiments of the wireless network can implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 1306 can comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 1360 and WD 1310 comprise various components described in more detail below. These components work together in order to provide network node and/or wireless device functionality, such as providing wireless connections in a wireless network. In different embodiments, the wireless network can comprise any number of wired or wireless networks, network nodes, base stations, controllers, wireless devices, relay stations, and/or any other components or systems that can facilitate or participate in the communication of data and/or signals whether via wired or wireless connections.

Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations can be categorized based on the amount of coverage they provide (or, stated differently, their transmit power level) and can then also be referred to as femto base stations, pico base stations, micro base stations, or macro base stations. A base station can be a relay node or a relay donor node controlling a relay. A network node can also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station can also be referred to as nodes in a distributed antenna system (DAS).

Further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node can be a virtual network node as described in more detail below. More generally, however, network nodes can represent any suitable device (or group of devices) capable, configured, arranged, and/or operable to enable and/or provide a wireless device with access to the wireless network or to provide some service to a wireless device that has accessed the wireless network.

In FIG. 13, network node 1360 includes processing circuitry 1370, device readable medium 1380, interface 1390, auxiliary equipment 1384, power source 1386, power circuitry 1387, and antenna 1362. Although network node 1360 illustrated in the example wireless network of FIG. 13 can represent a device that includes the illustrated combination of hardware components, other embodiments can comprise network nodes with different combinations of components. It is to be understood that a network node comprises any suitable combination of hardware and/or software needed to perform the tasks, features, functions and methods and/or procedures disclosed herein. Moreover, while the components of network node 1360 are depicted as single boxes located within a larger box, or nested within multiple boxes, in practice, a network node can comprise multiple different physical components that make up a single illustrated component (e.g., device readable medium 1380 can comprise multiple separate hard drives as well as multiple RAM modules).

Similarly, network node 1360 can be composed of multiple physically separate components (e.g., a NodeB component and a RNC component, or a BTS component and a BSC component, etc.), which can each have their own respective components. In certain scenarios in which network node 1360 comprises multiple separate components (e.g., BTS and BSC components), one or more of the separate components can be shared among several network nodes. For example, a single RNC can control multiple NodeB's. In such a scenario, each unique NodeB and RNC pair, can in some instances be considered a single separate network node. In some embodiments, network node 1360 can be configured to support multiple radio access technologies (RATs). In such embodiments, some components can be duplicated (e.g., separate device readable medium 1380 for the different RATs) and some components can be reused (e.g., the same antenna 1362 can be shared by the RATs). Network node 1360 can also include multiple sets of the various illustrated components for different wireless technologies integrated into network node 1360, such as, for example, GSM, WCDMA, LTE, NR, WiFi, or Bluetooth wireless technologies. These wireless technologies can be integrated into the same or different chip or set of chips and other components within network node 1360.

Processing circuitry 1370 can be configured to perform any determining, calculating, or similar operations (e.g., certain obtaining operations) described herein as being provided by a network node. These operations performed by processing circuitry 1370 can include processing information obtained by processing circuitry 1370 by, for example, converting the obtained information into other information, comparing the obtained information or converted information to information stored in the network node, and/or performing one or more operations based on the obtained information or converted information, and as a result of said processing making a determination.

Processing circuitry 1370 can comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide various functionality of network node 1360, either alone or in conjunction with other network node 1360 components (e.g., device readable medium 1380). Such functionality can include any of the various wireless features, functions, or benefits discussed herein.

For example, processing circuitry 1370 can execute instructions stored in device readable medium 1380 or in memory within processing circuitry 1370. In some embodiments, processing circuitry 1370 can include a system on a chip (SOC). As a more specific example, instructions (also referred to as a computer program product) stored in medium 1380 can include instructions that, when executed by processing circuitry 1370, can configure network node 1360 to perform operations corresponding to various exemplary methods (e.g., procedures) described herein.

In some embodiments, processing circuitry 1370 can include one or more of radio frequency (RF) transceiver circuitry 1372 and baseband processing circuitry 1374. In some embodiments, radio frequency (RF) transceiver circuitry 1372 and baseband processing circuitry 1374 can be on separate chips (or sets of chips), boards, or units, such as radio units and digital units. In alternative embodiments, part or all of RF transceiver circuitry 1372 and baseband processing circuitry 1374 can be on the same chip or set of chips, boards, or units In certain embodiments, some or all of the functionality described herein as being provided by a network node, base station, eNB or other such network device can be performed by processing circuitry 1370 executing instructions stored on device readable medium 1380 or memory within processing circuitry 1370. In alternative embodiments, some or all of the functionality can be provided by processing circuitry 1370 without executing instructions stored on a separate or discrete device readable medium, such as in a hard-wired manner. In any of those embodiments, whether executing instructions stored on a device readable storage medium or not, processing circuitry 1370 can be configured to perform the described functionality. The benefits provided by such functionality are not limited to processing circuitry 1370 alone or to other components of network node 1360 but are enjoyed by network node 1360 as a whole, and/or by end users and the wireless network generally.

Device readable medium 1380 can comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that can be used by processing circuitry 1370. Device readable medium 1380 can store any suitable instructions, data or information, including a computer program, software, an application including one or more of logic, rules, code, tables, etc. and/or other instructions capable of being executed by processing circuitry 1370 and, utilized by network node 1360. Device readable medium 1380 can be used to store any calculations made by processing circuitry 1370 and/or any data received via interface 1390. In some embodiments, processing circuitry 1370 and device readable medium 1380 can be considered to be integrated.

Interface 1390 is used in the wired or wireless communication of signaling and/or data between network node 1360, network 1306, and/or WDs 1310. As illustrated, interface 1390 comprises port(s)/terminal(s) 1394 to send and receive data, for example to and from network 1306 over a wired connection. Interface 1390 also includes radio front end circuitry 1392 that can be coupled to, or in certain embodiments a part of, antenna 1362. Radio front end circuitry 1392 comprises filters 1398 and amplifiers 1396. Radio front end circuitry 1392 can be connected to antenna 1362 and processing circuitry 1370. Radio front end circuitry can be configured to condition signals communicated between antenna 1362 and processing circuitry 1370. Radio front end circuitry 1392 can receive digital data that is to be sent out to other network nodes or WDs via a wireless connection. Radio front end circuitry 1392 can convert the digital data into a radio signal having the appropriate channel and bandwidth parameters using a combination of filters 1398 and/or amplifiers 1396. The radio signal can then be transmitted via antenna 1362. Similarly, when receiving data, antenna 1362 can collect radio signals which are then converted into digital data by radio front end circuitry 1392. The digital data can be passed to processing circuitry 1370. In other embodiments, the interface can comprise different components and/or different combinations of components.

In certain alternative embodiments, network node 1360 may not include separate radio front end circuitry 1392, instead, processing circuitry 1370 can comprise radio front end circuitry and can be connected to antenna 1362 without separate radio front end circuitry 1392. Similarly, in some embodiments, all or some of RF transceiver circuitry 1372 can be considered a part of interface 1390. In still other embodiments, interface 1390 can include one or more ports or terminals 1394, radio front end circuitry 1392, and RF transceiver circuitry 1372, as part of a radio unit (not shown), and interface 1390 can communicate with baseband processing circuitry 1374, which is part of a digital unit (not shown).

Antenna 1362 can include one or more antennas, or antenna arrays, configured to send and/or receive wireless signals. Antenna 1362 can be coupled to radio front end circuitry 1390 and can be any type of antenna capable of transmitting and receiving data and/or signals wirelessly. In some embodiments, antenna 1362 can comprise one or more omni-directional, sector or panel antennas operable to transmit/receive radio signals between, for example, 2 GHz and 66 GHz. An omni-directional antenna can be used to transmit/receive radio signals in any direction, a sector antenna can be used to transmit/receive radio signals from devices within a particular area, and a panel antenna can be a line of sight antenna used to transmit/receive radio signals in a relatively straight line. In some instances, the use of more than one antenna can be referred to as MIMO. In certain embodiments, antenna 1362 can be separate from network node 1360 and can be connectable to network node 1360 through an interface or port.

Antenna 1362, interface 1390, and/or processing circuitry 1370 can be configured to perform any receiving operations and/or certain obtaining operations described herein as being performed by a network node. Any information, data and/or signals can be received from a wireless device, another network node and/or any other network equipment. Similarly, antenna 1362, interface 1390, and/or processing circuitry 1370 can be configured to perform any transmitting operations described herein as being performed by a network node. Any information, data and/or signals can be transmitted to a wireless device, another network node and/or any other network equipment.

Power circuitry 1387 can comprise, or be coupled to, power management circuitry and can be configured to supply the components of network node 1360 with power for performing the functionality described herein. Power circuitry 1387 can receive power from power source 1386. Power source 1386 and/or power circuitry 1387 can be configured to provide power to the various components of network node 1360 in a form suitable for the respective components (e.g., at a voltage and current level needed for each respective component). Power source 1386 can either be included in, or external to, power circuitry 1387 and/or network node 1360. For example, network node 1360 can be connectable to an external power source (e.g., an electricity outlet) via an input circuitry or interface such as an electrical cable, whereby the external power source supplies power to power circuitry 1387. As a further example, power source 1386 can comprise a source of power in the form of a battery or battery pack which is connected to, or integrated in, power circuitry 1387. The battery can provide backup power should the external power source fail. Other types of power sources, such as photovoltaic devices, can also be used.

Alternative embodiments of network node 1360 can include additional components beyond those shown in FIG. 13 that can be responsible for providing certain aspects of the network node's functionality, including any of the functionality described herein and/or any functionality necessary to support the subject matter described herein. For example, network node 1360 can include user interface equipment to allow and/or facilitate input of information into network node 1360 and to allow and/or facilitate output of information from network node 1360. This can allow and/or facilitate a user to perform diagnostic, maintenance, repair, and other administrative functions for network node 1360.

In some embodiments, a wireless device (WD, e.g., WD 1310) can be configured to transmit and/or receive information without direct human interaction. For instance, a WD can be designed to transmit information to a network on a predetermined schedule, when triggered by an internal or external event, or in response to requests from the network. Examples of a WD include, but are not limited to, smart phones, mobile phones, cell phones, voice over IP (VoIP) phones, wireless local loop phones, desktop computers, personal digital assistants (PDAs), wireless cameras, gaming consoles or devices, music storage devices, playback appliances, wearable devices, wireless endpoints, mobile stations, tablets, laptops, laptop-embedded equipment (LEE), laptop-mounted equipment (LME), smart devices, wireless customer-premise equipment (CPE), mobile-type communication (MTC) devices, Internet-of-Things (IoT) devices, vehicle-mounted wireless terminal devices, etc.

A WD can support device-to-device (D2D) communication, for example by implementing a 3GPP standard for sidelink communication, vehicle-to-vehicle (V2V), vehicle-to-infrastructure (V2I), vehicle-to-everything (V2X) and can in this case be referred to as a D2D communication device. As yet another specific example, in an Internet of Things (IoT) scenario, a WD can represent a machine or other device that performs monitoring and/or measurements and transmits the results of such monitoring and/or measurements to another WD and/or a network node. The WD can in this case be a machine-to-machine (M2M) device, which can in a 3GPP context be referred to as an MTC device. As one particular example, the WD can be a UE implementing the 3GPP narrow band internet of things (NB-IoT) standard. Particular examples of such machines or devices are sensors, metering devices such as power meters, industrial machinery, or home or personal appliances (e.g., refrigerators, televisions, etc.) personal wearables (e.g., watches, fitness trackers, etc.). In other scenarios, a WD can represent a vehicle or other equipment that is capable of monitoring and/or reporting on its operational status or other functions associated with its operation. A WD as described above can represent the endpoint of a wireless connection, in which case the device can be referred to as a wireless terminal. Furthermore, a WD as described above can be mobile, in which case it can also be referred to as a mobile device or a mobile terminal.

As illustrated, wireless device 1310 includes antenna 1311, interface 1314, processing circuitry 1320, device readable medium 1330, user interface equipment 1332, auxiliary equipment 1334, power source 1336 and power circuitry 1337. WD 1310 can include multiple sets of one or more of the illustrated components for different wireless technologies supported by WD 1310, such as, for example, GSM, WCDMA, LTE, NR, WiFi, WiMAX, or Bluetooth wireless technologies, just to mention a few. These wireless technologies can be integrated into the same or different chips or set of chips as other components within WD 1310.

Antenna 1311 can include one or more antennas or antenna arrays, configured to send and/or receive wireless signals, and is connected to interface 1314. In certain alternative embodiments, antenna 1311 can be separate from WD 1310 and be connectable to WD 1310 through an interface or port. Antenna 1311, interface 1314, and/or processing circuitry 1320 can be configured to perform any receiving or transmitting operations described herein as being performed by a WD. Any information, data and/or signals can be received from a network node and/or another WD. In some embodiments, radio front end circuitry and/or antenna 1311 can be considered an interface.

As illustrated, interface 1314 comprises radio front end circuitry 1312 and antenna 1311. Radio front end circuitry 1312 comprise one or more filters 1318 and amplifiers 1316. Radio front end circuitry 1314 is connected to antenna 1311 and processing circuitry 1320 and can be configured to condition signals communicated between antenna 1311 and processing circuitry 1320. Radio front end circuitry 1312 can be coupled to or a part of antenna 1311. In some embodiments, WD 1310 may not include separate radio front end circuitry 1312; rather, processing circuitry 1320 can comprise radio front end circuitry and can be connected to antenna 1311. Similarly, in some embodiments, some or all of RF transceiver circuitry 1322 can be considered a part of interface 1314. Radio front end circuitry 1312 can receive digital data that is to be sent out to other network nodes or WDs via a wireless connection. Radio front end circuitry 1312 can convert the digital data into a radio signal having the appropriate channel and bandwidth parameters using a combination of filters 1318 and/or amplifiers 1316. The radio signal can then be transmitted via antenna 1311. Similarly, when receiving data, antenna 1311 can collect radio signals which are then converted into digital data by radio front end circuitry 1312. The digital data can be passed to processing circuitry 1320. In other embodiments, the interface can comprise different components and/or different combinations of components.

Processing circuitry 1320 can comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide WD 1310 functionality either alone or in combination with other WD 1310 components, such as device readable medium 1330. Such functionality can include any of the various wireless features or benefits discussed herein.

For example, processing circuitry 1320 can execute instructions stored in device readable medium 1330 or in memory within processing circuitry 1320 to provide the functionality disclosed herein. More specifically, instructions (also referred to as a computer program product) stored in medium 1330 can include instructions that, when executed by processor 1320, can configure wireless device 1310 to perform operations corresponding to various exemplary methods (e.g., procedures) described herein.

As illustrated, processing circuitry 1320 includes one or more of RF transceiver circuitry 1322, baseband processing circuitry 1324, and application processing circuitry 1326. In other embodiments, the processing circuitry can comprise different components and/or different combinations of components. In certain embodiments processing circuitry 1320 of WD 1310 can comprise a SOC. In some embodiments, RF transceiver circuitry 1322, baseband processing circuitry 1324, and application processing circuitry 1326 can be on separate chips or sets of chips. In alternative embodiments, part or all of baseband processing circuitry 1324 and application processing circuitry 1326 can be combined into one chip or set of chips, and RF transceiver circuitry 1322 can be on a separate chip or set of chips. In still alternative embodiments, part or all of RF transceiver circuitry 1322 and baseband processing circuitry 1324 can be on the same chip or set of chips, and application processing circuitry 1326 can be on a separate chip or set of chips. In yet other alternative embodiments, part or all of RF transceiver circuitry 1322, baseband processing circuitry 1324, and application processing circuitry 1326 can be combined in the same chip or set of chips. In some embodiments, RF transceiver circuitry 1322 can be a part of interface 1314. RF transceiver circuitry 1322 can condition RF signals for processing circuitry 1320.

In certain embodiments, some or all of the functionality described herein as being performed by a WD can be provided by processing circuitry 1320 executing instructions stored on device readable medium 1330, which in certain embodiments can be a computer-readable storage medium. In alternative embodiments, some or all of the functionality can be provided by processing circuitry 1320 without executing instructions stored on a separate or discrete device readable storage medium, such as in a hard-wired manner. In any of those particular embodiments, whether executing instructions stored on a device readable storage medium or not, processing circuitry 1320 can be configured to perform the described functionality. The benefits provided by such functionality are not limited to processing circuitry 1320 alone or to other components of WD 1310, but are enjoyed by WD 1310 as a whole, and/or by end users and the wireless network generally.

Processing circuitry 1320 can be configured to perform any determining, calculating, or similar operations (e.g., certain obtaining operations) described herein as being performed by a WD. These operations, as performed by processing circuitry 1320, can include processing information obtained by processing circuitry 1320 by, for example, converting the obtained information into other information, comparing the obtained information or converted information to information stored by WD 1310, and/or performing one or more operations based on the obtained information or converted information, and as a result of said processing making a determination.

Device readable medium 1330 can be operable to store a computer program, software, an application including one or more of logic, rules, code, tables, etc. and/or other instructions capable of being executed by processing circuitry 1320. Device readable medium 1330 can include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that can be used by processing circuitry 1320. In some embodiments, processing circuitry 1320 and device readable medium 1330 can be considered to be integrated.

User interface equipment 1332 can include components that allow and/or facilitate a human user to interact with WD 1310. Such interaction can be of many forms, such as visual, audial, tactile, etc. User interface equipment 1332 can be operable to produce output to the user and to allow and/or facilitate the user to provide input to WD 1310. The type of interaction can vary depending on the type of user interface equipment 1332 installed in WD 1310. For example, if WD 1310 is a smart phone, the interaction can be via a touch screen; if WD 1310 is a smart meter, the interaction can be through a screen that provides usage (e.g., the number of gallons used) or a speaker that provides an audible alert (e.g., if smoke is detected). User interface equipment 1332 can include input interfaces, devices and circuits, and output interfaces, devices and circuits. User interface equipment 1332 can be configured to allow and/or facilitate input of information into WD 1310 and is connected to processing circuitry 1320 to allow and/or facilitate processing circuitry 1320 to process the input information. User interface equipment 1332 can include, for example, a microphone, a proximity or other sensor, keys/buttons, a touch display, one or more cameras, a USB port, or other input circuitry. User interface equipment 1332 is also configured to allow and/or facilitate output of information from WD 1310, and to allow and/or facilitate processing circuitry 1320 to output information from WD 1310. User interface equipment 1332 can include, for example, a speaker, a display, vibrating circuitry, a USB port, a headphone interface, or other output circuitry. Using one or more input and output interfaces, devices, and circuits, of user interface equipment 1332, WD 1310 can communicate with end users and/or the wireless network and allow and/or facilitate them to benefit from the functionality described herein.

Auxiliary equipment 1334 is operable to provide more specific functionality which may not be generally performed by WDs. This can comprise specialized sensors for doing measurements for various purposes, interfaces for additional types of communication such as wired communications etc. The inclusion and type of components of auxiliary equipment 1334 can vary depending on the embodiment and/or scenario.

Power source 1336 can, in some embodiments, be in the form of a battery or battery pack. Other types of power sources, such as an external power source (e.g., an electricity outlet), photovoltaic devices or power cells, can also be used. WD 1310 can further comprise power circuitry 1337 for delivering power from power source 1336 to the various parts of WD 1310 which need power from power source 1336 to carry out any functionality described or indicated herein. Power circuitry 1337 can in certain embodiments comprise power management circuitry. Power circuitry 1337 can additionally or alternatively be operable to receive power from an external power source; in which case WD 1310 can be connectable to the external power source (such as an electricity outlet) via input circuitry or an interface such as an electrical power cable. Power circuitry 1337 can also in certain embodiments be operable to deliver power from an external power source to power source 1336. This can be, for example, for the charging of power source 1336. Power circuitry 1337 can perform any converting or other modification to the power from power source 1336 to make it suitable for supply to the respective components of WD 1310.

Figure 14:
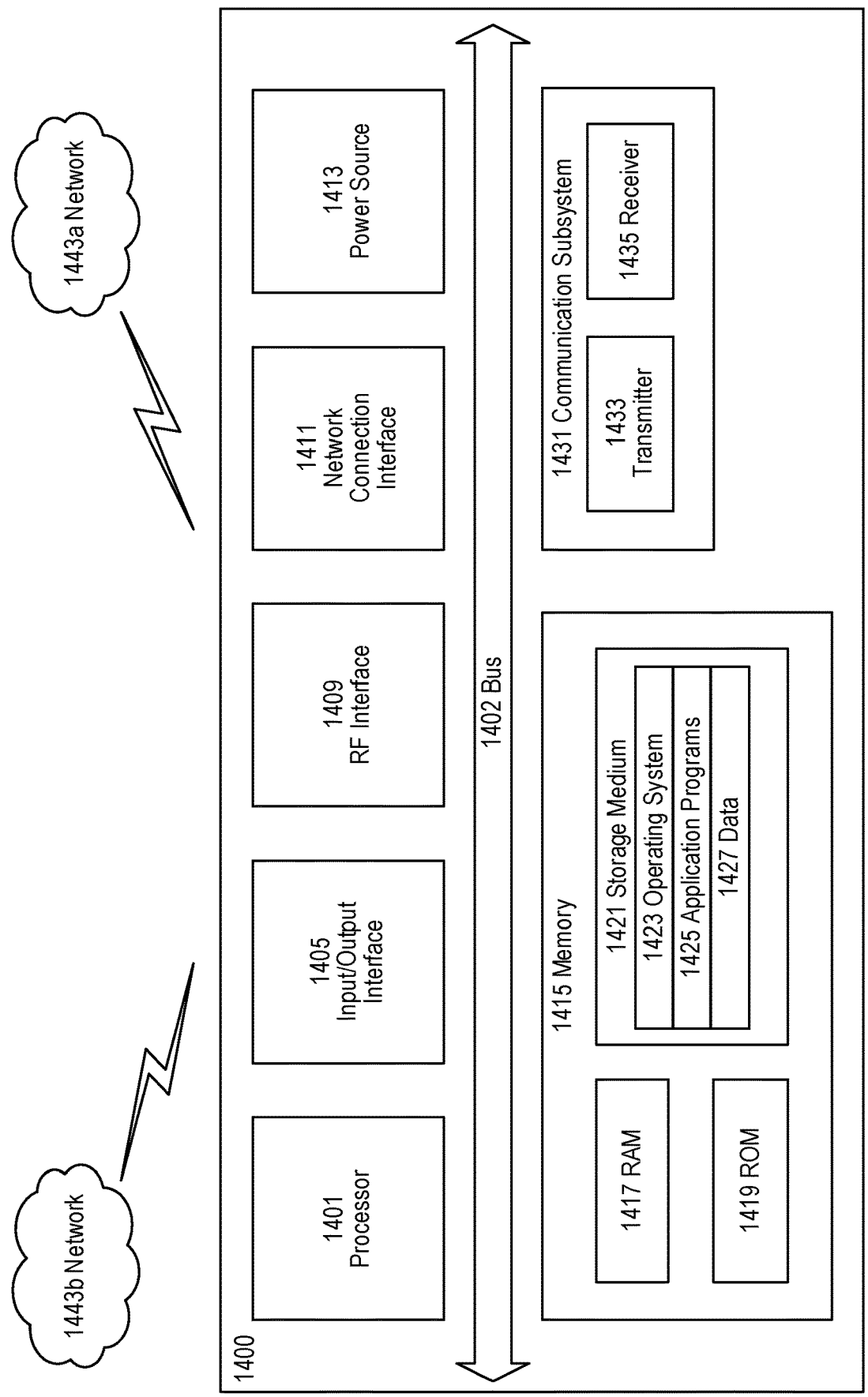
FIG. 14 illustrates an exemplary embodiment of a UE, in accordance with various aspects described herein.

FIG. 14 illustrates one embodiment of a UE in accordance with various aspects described herein. As used herein, a user equipment or UE may not necessarily have a user in the sense of a human user who owns and/or operates the relevant device. Instead, a UE can represent a device that is intended for sale to, or operation by, a human user but which may not, or which may not initially, be associated with a specific human user (e.g., a smart sprinkler controller). Alternatively, a UE can represent a device that is not intended for sale to, or operation by, an end user but which can be associated with or operated for the benefit of a user (e.g., a smart power meter). UE 14200 can be any UE identified by the 3$^{rd}$ Generation Partnership Project (3GPP), including a NB-IoT UE, a machine type communication (MTC) UE, and/or an enhanced MTC (eMTC) UE. UE 1400, as illustrated in FIG. 14, is one example of a WD configured for communication in accordance with one or more communication standards promulgated by the 3$^{rd}$ Generation Partnership Project (3GPP), such as 3GPP's GSM, UMTS, LTE, and/or 5G standards. As mentioned previously, the term WD and UE can be used interchangeable. Accordingly, although FIG. 14 is a UE, the components discussed herein are equally applicable to a WD, and vice-versa.

In FIG. 14, UE 1400 includes processing circuitry 1401 that is operatively coupled to input/output interface 1405, radio frequency (RF) interface 1409, network connection interface 1411, memory 1415 including random access memory (RAM) 1417, read-only memory (ROM) 1419, and storage medium 1421 or the like, communication subsystem 1431, power source 1433, and/or any other component, or any combination thereof. Storage medium 1421 includes operating system 1423, application program 1425, and data 1427. In other embodiments, storage medium 1421 can include other similar types of information. Certain UEs can utilize all of the components shown in FIG. 14, or only a subset of the components. The level of integration between the components can vary from one UE to another UE. Further, certain UEs can contain multiple instances of a component, such as multiple processors, memories, transceivers, transmitters, receivers, etc.

In FIG. 14, processing circuitry 1401 can be configured to process computer instructions and data. Processing circuitry 1401 can be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 1401 can include two central processing units (CPUs). Data can be information in a form suitable for use by a computer.

In the depicted embodiment, input/output interface 1405 can be configured to provide a communication interface to an input device, output device, or input and output device. UE 1400 can be configured to use an output device via input/output interface 1405. An output device can use the same type of interface port as an input device. For example, a USB port can be used to provide input to and output from UE 1400. The output device can be a speaker, a sound card, a video card, a display, a monitor, a printer, an actuator, an emitter, a smartcard, another output device, or any combination thereof. UE 1400 can be configured to use an input device via input/output interface 1405 to allow and/or facilitate a user to capture information into UE 1400. The input device can include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display can include a capacitive or resistive touch sensor to sense input from a user. A sensor can be, for instance, an accelerometer, a gyroscope, a tilt sensor, a force sensor, a magnetometer, an optical sensor, a proximity sensor, another like sensor, or any combination thereof. For example, the input device can be an accelerometer, a magnetometer, a digital camera, a microphone, and an optical sensor.

In FIG. 14, RF interface 1409 can be configured to provide a communication interface to RF components such as a transmitter, a receiver, and an antenna. Network connection interface 1411 can be configured to provide a communication interface to network 1443*a*. Network 1443*a* can encompass wired and/or wireless networks such as a local-area network (LAN), a wide-area network (WAN), a computer network, a wireless network, a telecommunications network, another like network or any combination thereof. For example, network 1443*a* can comprise a Wi-Fi network. Network connection interface 1411 can be configured to include a receiver and a transmitter interface used to communicate with one or more other devices over a communication network according to one or more communication protocols, such as Ethernet, TCP/IP, SONET, ATM, or the like. Network connection interface 1411 can implement receiver and transmitter functionality appropriate to the communication network links (e.g., optical, electrical, and the like). The transmitter and receiver functions can share circuit components, software or firmware, or alternatively can be implemented separately.

RAM 1417 can be configured to interface via bus 1402 to processing circuitry 1401 to provide storage or caching of data or computer instructions during the execution of software programs such as the operating system, application programs, and device drivers. ROM 1419 can be configured to provide computer instructions or data to processing circuitry 1401. For example, ROM 1419 can be configured to store invariant low-level system code or data for basic system functions such as basic input and output (I/O), startup, or reception of keystrokes from a keyboard that are stored in a non-volatile memory. Storage medium 1421 can be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives.

In one example, storage medium 1421 can be configured to include operating system 1423; application program 1425 such as a web browser application, a widget or gadget engine or another application; and data file 1427. Storage medium 1421 can store, for use by UE 1400, any of a variety of various operating systems or combinations of operating systems. For example, application program 1425 can include executable program instructions (also referred to as a computer program product) that, when executed by processor 1401, can configure UE 1400 to perform operations corresponding to various exemplary methods (e.g., procedures) described herein.

Storage medium 1421 can be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 1421 can allow and/or facilitate UE 1400 to access computer-executable instructions, application programs or the like, stored on transitory or non-transitory memory media, to off-load data, or to upload data. An article of manufacture, such as one utilizing a communication system can be tangibly embodied in storage medium 1421, which can comprise a device readable medium.

In FIG. 14, processing circuitry 1401 can be configured to communicate with network 1443*b* using communication subsystem 1431. Network 1443*a* and network 1443*b* can be the same network or networks or different network or networks. Communication subsystem 1431 can be configured to include one or more transceivers used to communicate with network 1443*b*. For example, communication subsystem 1431 can be configured to include one or more transceivers used to communicate with one or more remote transceivers of another device capable of wireless communication such as another WD, UE, or base station of a radio access network (RAN) according to one or more communication protocols, such as IEEE 802.14, CDMA, WCDMA, GSM, LTE, UTRAN, WiMax, or the like. Each transceiver can include transmitter 1433 and/or receiver 1435 to implement transmitter or receiver functionality, respectively, appropriate to the RAN links (e.g., frequency allocations and the like). Further, transmitter 1433 and receiver 1435 of each transceiver can share circuit components, software or firmware, or alternatively can be implemented separately.

In the illustrated embodiment, the communication functions of communication subsystem 1431 can include data communication, voice communication, multimedia communication, short-range communications such as Bluetooth, near-field communication, location-based communication such as the use of the global positioning system (GPS) to determine a location, another like communication function, or any combination thereof. For example, communication subsystem 1431 can include cellular communication, Wi-Fi communication, Bluetooth communication, and GPS communication. Network 1443*b* can encompass wired and/or wireless networks such as a local-area network (LAN), a wide-area network (WAN), a computer network, a wireless network, a telecommunications network, another like network or any combination thereof. For example, network 1443*b* can be a cellular network, a Wi-Fi network, and/or a near-field network. Power source 1413 can be configured to provide alternating current (AC) or direct current (DC) power to components of UE 1400.

The features, benefits and/or functions described herein can be implemented in one of the components of UE 1400 or partitioned across multiple components of UE 1400. Further, the features, benefits, and/or functions described herein can be implemented in any combination of hardware, software or firmware. In one example, communication subsystem 1431 can be configured to include any of the components described herein. Further, processing circuitry 1401 can be configured to communicate with any of such components over bus 1402. In another example, any of such components can be represented by program instructions stored in memory that when executed by processing circuitry 1401 perform the corresponding functions described herein. In another example, the functionality of any of such components can be partitioned between processing circuitry 1401 and communication subsystem 1431. In another example, the non-computationally intensive functions of any of such components can be implemented in software or firmware and the computationally intensive functions can be implemented in hardware.

Figure 15:
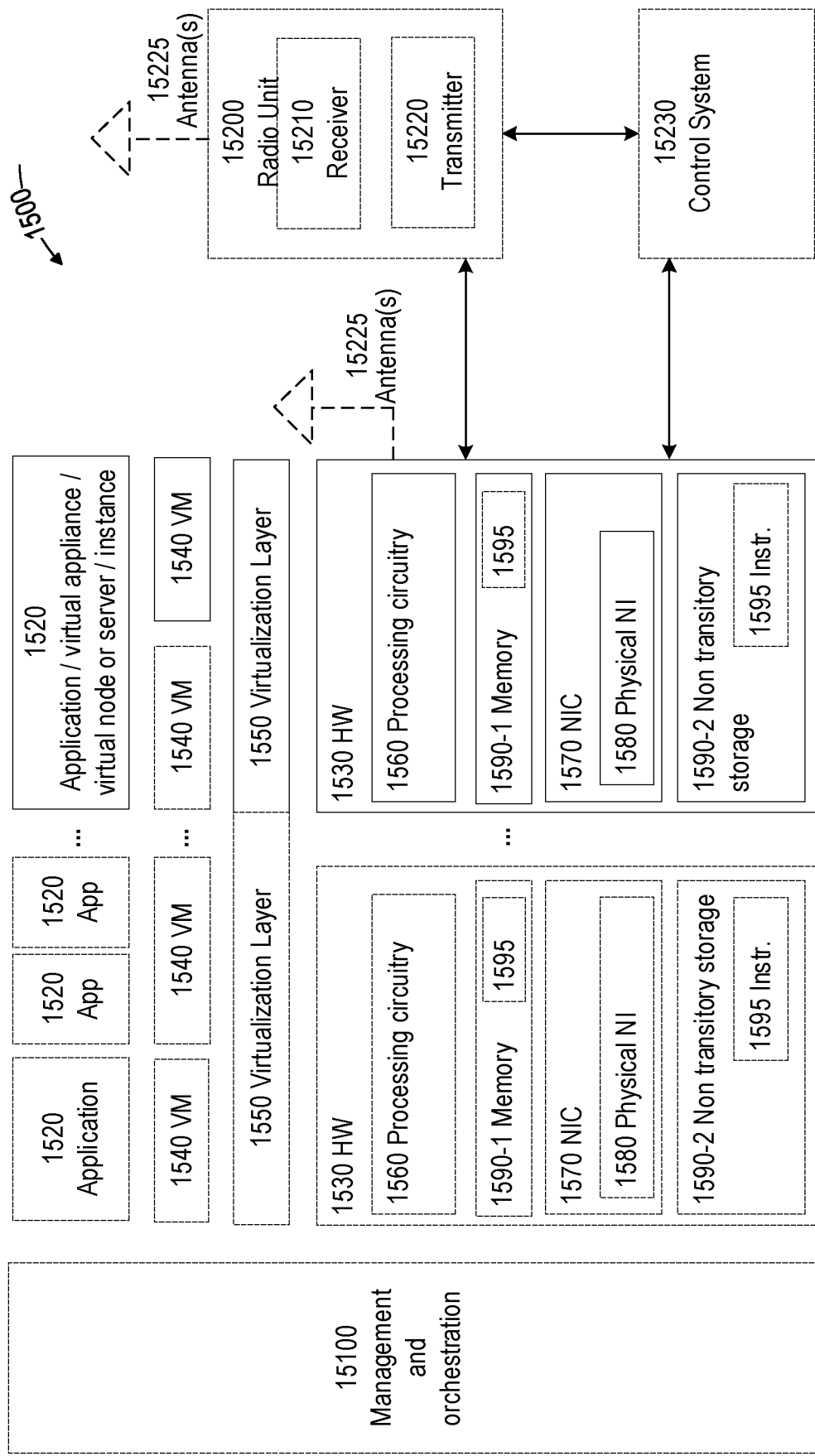
FIG. 15 is a block diagram illustrating an exemplary virtualization environment usable for implementation of various embodiments of network nodes described herein.

FIG. 15 is a schematic block diagram illustrating a virtualization environment 1500 in which functions implemented by some embodiments can be virtualized. In the present context, virtualizing means creating virtual versions of apparatuses or devices which can include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein can be implemented as virtual components executed by one or more virtual machines implemented in one or more virtual environments 1500 hosted by one or more of hardware nodes 1530. Further, in embodiments in which the virtual node is not a radio access node or does not require radio connectivity (e.g., a core network node), then the network node can be entirely virtualized.

The functions can be implemented by one or more applications 1520 (which can alternatively be called software instances, virtual appliances, network functions, virtual nodes, virtual network functions, etc.) operative to implement some of the features, functions, and/or benefits of some of the embodiments disclosed herein. Applications 1520 are run in virtualization environment 1500 which provides hardware 1530 comprising processing circuitry 1560 and memory 1590. Memory 1590 contains instructions 1595 executable by processing circuitry 1560 whereby application 1520 is operative to provide one or more of the features, benefits, and/or functions disclosed herein.

Virtualization environment 1500 can include general-purpose or special-purpose network hardware devices (or nodes) 1530 comprising a set of one or more processors or processing circuitry 1560, which can be commercial off-the-shelf (COTS) processors, dedicated Application Specific Integrated Circuits (ASICs), or any other type of processing circuitry including digital or analog hardware components or special purpose processors. Each hardware device can comprise memory 1590-1 which can be non-persistent memory for temporarily storing instructions 1595 or software executed by processing circuitry 1560. For example, instructions 1595 can include program instructions (also referred to as a computer program product) that, when executed by processing circuitry 1560, can configure hardware node 1520 to perform operations corresponding to various exemplary methods (e.g., procedures) described herein. Such operations can also be attributed to virtual node(s) 1520 that is/are hosted by hardware node 1530.

Each hardware device can comprise one or more network interface controllers (NICs) 1570, also known as network interface cards, which include physical network interface 1580. Each hardware device can also include non-transitory, persistent, machine-readable storage media 1590-2 having stored therein software 1595 and/or instructions executable by processing circuitry 1560. Software 1595 can include any type of software including software for instantiating one or more virtualization layers 1550 (also referred to as hypervisors), software to execute virtual machines 1540 as well as software allowing it to execute functions, features and/or benefits described in relation with some embodiments described herein.

Virtual machines 1540, comprise virtual processing, virtual memory, virtual networking or interface and virtual storage, and can be run by a corresponding virtualization layer 1550 or hypervisor. Different embodiments of the instance of virtual appliance 1520 can be implemented on one or more of virtual machines 1540, and the implementations can be made in different ways.

During operation, processing circuitry 1560 executes software 1595 to instantiate the hypervisor or virtualization layer 1550, which can sometimes be referred to as a virtual machine monitor (VMM). Virtualization layer 1550 can present a virtual operating platform that appears like networking hardware to virtual machine 1540.

As shown in FIG. 15, hardware 1530 can be a standalone network node with generic or specific components. Hardware 1530 can comprise antenna 15225 and can implement some functions via virtualization. Alternatively, hardware 1530 can be part of a larger cluster of hardware (e.g., such as in a data center or customer premise equipment (CPE)) where many hardware nodes work together and are managed via management and orchestration (MANO) 15100, which, among others, oversees lifecycle management of applications 1520.

Virtualization of the hardware is in some contexts referred to as network function virtualization (NFV). NFV can be used to consolidate many network equipment types onto industry standard high volume server hardware, physical switches, and physical storage, which can be located in data centers, and customer premise equipment.

In the context of NFV, virtual machine 1540 can be a software implementation of a physical machine that runs programs as if they were executing on a physical, non-virtualized machine. Each of virtual machines 1540, and that part of hardware 1530 that executes that virtual machine, be it hardware dedicated to that virtual machine and/or hardware shared by that virtual machine with others of the virtual machines 1540, forms a separate virtual network elements (VNE).

Still in the context of NFV, Virtual Network Function (VNF) is responsible for handling specific network functions that run in one or more virtual machines 1540 on top of hardware networking infrastructure 1530 and corresponds to application 1520 in FIG. 15.

In some embodiments, one or more radio units 15200 that each include one or more transmitters 15220 and one or more receivers 15210 can be coupled to one or more antennas 15225. Radio units 15200 can communicate directly with hardware nodes 1530 via one or more appropriate network interfaces and can be used in combination with the virtual components to provide a virtual node with radio capabilities, such as a radio access node or a base station. Nodes arranged in this manner can also communicate with one or more UEs, such as described elsewhere herein.

In some embodiments, some signaling can be performed via control system 15230, which can alternatively be used for communication between the hardware nodes 1530 and radio units 15200.

Figure 16:
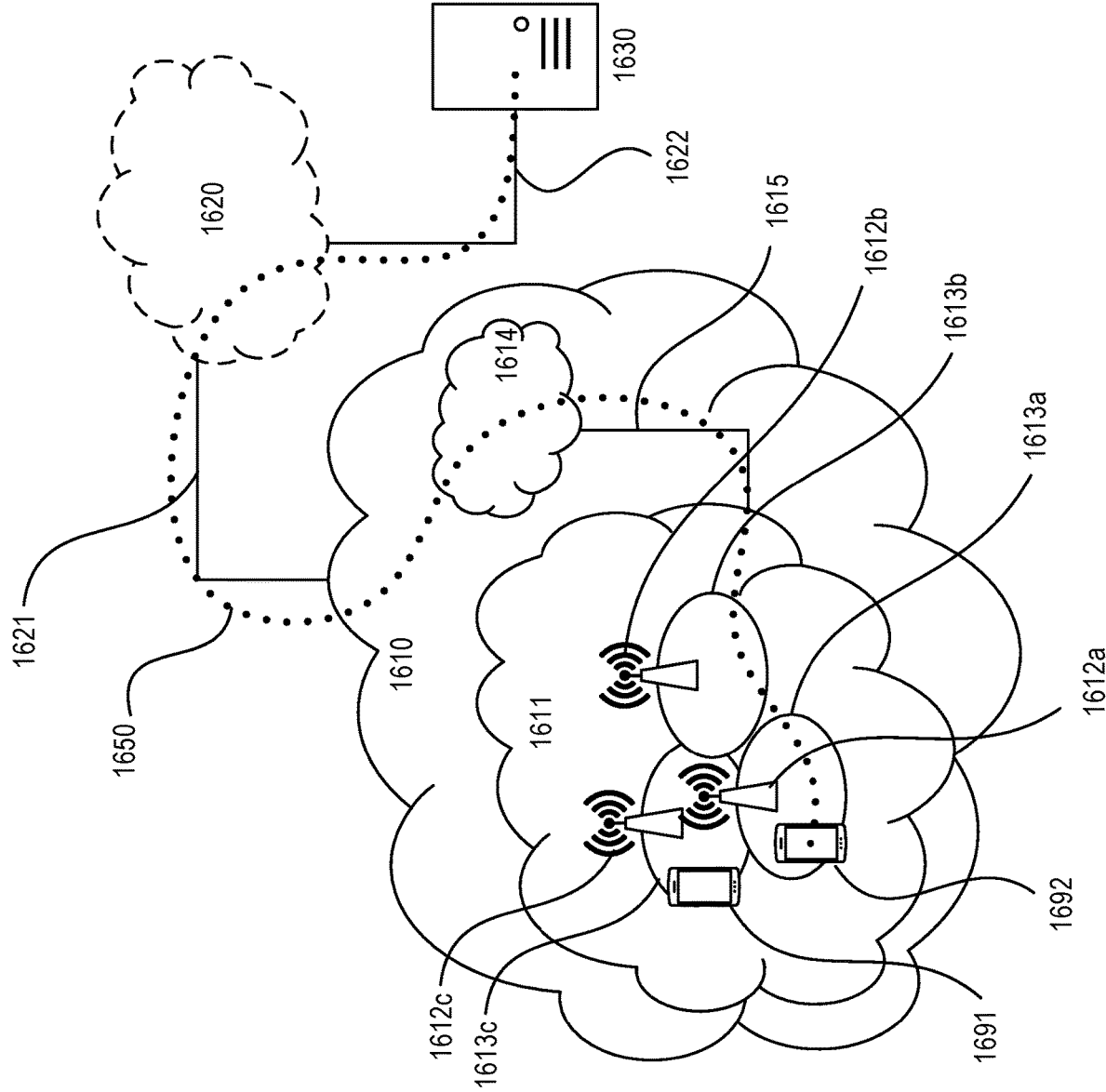
FIGS. 16-17 are block diagrams of various exemplary communication systems and/or networks, in accordance with various aspects described herein.

With reference to FIG. 16, in accordance with an embodiment, a communication system includes telecommunication network 1610, such as a 3GPP-type cellular network, which comprises access network 1611, such as a radio access network, and core network 1614. Access network 1611 comprises a plurality of base stations 1612a, 1612b, 1612c, such as NBs, eNBs, gNBs or other types of wireless access points, each defining a corresponding coverage area 1613a, 1613b, 1613c. Each base station 1612a, 1612b, 1612c is connectable to core network 1614 over a wired or wireless connection 1615. A first UE 1691 located in coverage area 1613c can be configured to wirelessly connect to, or be paged by, the corresponding base station 1612c. A second UE 1692 in coverage area 1613a is wirelessly connectable to the corresponding base station 1612a. While a plurality of UEs 1691, 1692 are illustrated in this example, the disclosed embodiments are equally applicable to a situation where a sole UE is in the coverage area or where a sole UE is connecting to the Telecommunication network 1610 is itself connected to host computer 1630, which can be embodied in the hardware and/or software of a standalone server, a cloud-implemented server, a distributed server or as processing resources in a server farm. Host computer 1630 can be under the ownership or control of a service provider or can be operated by the service provider or on behalf of the service provider. Connections 1621 and 1622 between telecommunication network 1610 and host computer 1630 can extend directly from core network 1614 to host computer 1630 or can go via an optional intermediate network 1620. Intermediate network 1620 can be one of, or a combination of more than one of, a public, private or hosted network; intermediate network 1620, if any, can be a backbone network or the Internet; in particular, intermediate network 1620 can comprise two or more sub-networks (not shown).

The communication system of FIG. 16 as a whole enables connectivity between the connected UEs 1691, 1692 and host computer 1630. The connectivity can be described as an over-the-top (OTT) connection 1650. Host computer 1630 and the connected UEs 1691, 1692 are configured to communicate data and/or signaling via OTT connection 1650, using access network 1611, core network 1614, any intermediate network 1620 and possible further infrastructure (not shown) as intermediaries. OTT connection 1650 can be transparent in the sense that the participating communication devices through which OTT connection 1650 passes are unaware of routing of uplink and downlink communications. For example, base station 1612 may not or need not be informed about the past routing of an incoming downlink communication with data originating from host computer 1630 to be forwarded (e.g., handed over) to a connected UE 1691. Similarly, base station 1612 need not be aware of the future routing of an outgoing uplink communication originating from the UE 1691 towards the host computer 1630.

Example implementations, in accordance with an embodiment, of the UE, base station and host computer discussed in the preceding paragraphs will now be described with reference to FIG. 17. In communication system 1700, host computer 1710 comprises hardware 1715 including communication interface 1716 configured to set up and maintain a wired or wireless connection with an interface of a different communication device of communication system 1700. Host computer 1710 further comprises processing circuitry 1718, which can have storage and/or processing capabilities. In particular, processing circuitry 1718 can comprise one or more programmable processors, application-specific integrated circuits, field programmable gate arrays or combinations of these (not shown) adapted to execute instructions. Host computer 1710 further comprises software 1711, which is stored in or accessible by host computer 1710 and executable by processing circuitry 1718. Software 1711 includes host application 1712. Host application 1712 can be operable to provide a service to a remote user, such as UE 1730 connecting via OTT connection 1750 terminating at UE 1730 and host computer 1710. In providing the service to the remote user, host application 1712 can provide user data which is transmitted using OTT connection 1750.

Communication system 1700 can also include base station 1720 provided in a telecommunication system and comprising hardware 1725 enabling it to communicate with host computer 1710 and with UE 1730. Hardware 1725 can include communication interface 1726 for setting up and maintaining a wired or wireless connection with an interface of a different communication device of communication system 1700, as well as radio interface 1727 for setting up and maintaining at least wireless connection 1770 with UE 1730 located in a coverage area (not shown in FIG. 17) served by base station 1720. Communication interface 1726 can be configured to facilitate connection 1760 to host computer 1710. Connection 1760 can be direct, or it can pass through a core network (not shown in FIG. 17) of the telecommunication system and/or through one or more intermediate networks outside the telecommunication system. In the embodiment shown, hardware 1725 of base station 1720 can also include processing circuitry 1728, which can comprise one or more programmable processors, application-specific integrated circuits, field programmable gate arrays or combinations of these (not shown) adapted to execute instructions.

Base station 1720 also includes software 1721 stored internally or accessible via an external connection. For example, software 1721 can include program instructions (also referred to as a computer program product) that, when executed by processing circuitry 1728, can configure base station 1720 to perform operations corresponding to various exemplary methods (e.g., procedures) described herein.

Communication system 1700 can also include UE 1730 already referred to, whose hardware 1735 can include radio interface 1737 configured to set up and maintain wireless connection 1770 with a base station serving a coverage area in which UE 1730 is currently located. Hardware 1735 of UE 1730 can also include processing circuitry 1738, which can comprise one or more programmable processors, application-specific integrated circuits, field programmable gate arrays or combinations of these (not shown) adapted to execute instructions.

UE 1730 also includes software 1731, which is stored in or accessible by UE 1730 and executable by processing circuitry 1738. Software 1731 includes client application 1732. Client application 1732 can be operable to provide a service to a human or non-human user via UE 1730, with the support of host computer 1710. In host computer 1710, an executing host application 1712 can communicate with the executing client application 1732 via OTT connection 1750 terminating at UE 1730 and host computer 1710. In providing the service to the user, client application 1732 can receive request data from host application 1712 and provide user data in response to the request data. OTT connection 1750 can transfer both the request data and the user data.

Client application 1732 can interact with the user to generate the user data that it provides. Software 1731 can also include program instructions (also referred to as a computer program product) that, when executed by processing circuitry 1738, can configure UE 1730 to perform operations corresponding to various exemplary methods (e.g., procedures) described herein.

Figure 17:
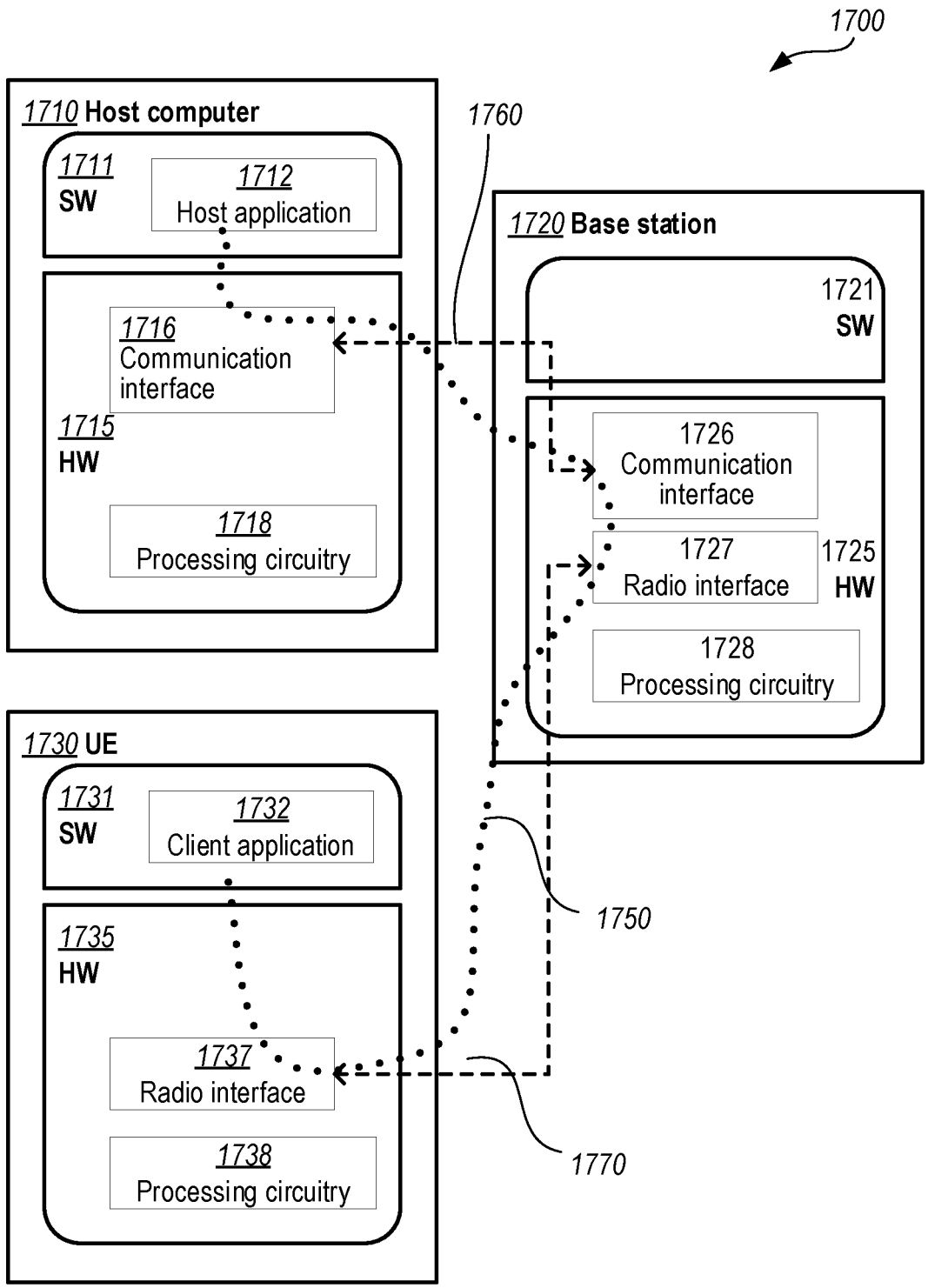

It is noted that host computer 1710, base station 1720 and UE 1730 illustrated in FIG. 17 can be similar or identical to host computer 1230, one of base stations 1712*a*, 1712*b*, 1712*c* and one of UEs 1791, 1792 of FIG. 17, respectively. This is to say, the inner workings of these entities can be as shown in FIG. 17 and independently, the surrounding network topology can be that of FIG. 17.

In FIG. 17, OTT connection 1750 has been drawn abstractly to illustrate the communication between host computer 1710 and UE 1730 via base station 1720, without explicit reference to any intermediary devices and the precise routing of messages via these devices. Network infrastructure can determine the routing, which it can be configured to hide from UE 1730 or from the service provider operating host computer 1710, or both. While OTT connection 1750 is active, the network infrastructure can further take decisions by which it dynamically changes the routing (e.g., on the basis of load balancing consideration or reconfiguration of the network).

Wireless connection 1770 between UE 1730 and base station 1720 is in accordance with the teachings of the embodiments described throughout this disclosure. One or more of the various embodiments improve the performance of OTT services provided to UE 1730 using OTT connection 1750, in which wireless connection 1770 forms the last segment. More precisely, the exemplary embodiments disclosed herein can improve flexibility for the network to monitor end-to-end quality-of-service (QoS) of data flows, including their corresponding radio bearers, associated with data sessions between a user equipment (UE) and another entity, such as an OTT data application or service external to the 5G network. These and other advantages can facilitate more timely design, implementation, and deployment of 5G/NR solutions. Furthermore, such embodiments can facilitate flexible and timely control of data session QoS, which can lead to improvements in capacity, throughput, latency, etc. that are envisioned by 5G/NR and important for the growth of OTT services.

A measurement procedure can be provided for the purpose of monitoring data rate, latency and other network operational aspects on which the one or more embodiments improve. There can further be an optional network functionality for reconfiguring OTT connection 1750 between host computer 1710 and UE 1730, in response to variations in the measurement results. The measurement procedure and/or the network functionality for reconfiguring OTT connection 1750 can be implemented in software 1711 and hardware 1715 of host computer 1710 or in software 1731 and hardware 1735 of UE 1730, or both. In embodiments, sensors (not shown) can be deployed in or in association with communication devices through which OTT connection 1750 passes; the sensors can participate in the measurement procedure by supplying values of the monitored quantities exemplified above, or supplying values of other physical quantities from which software 1711, 1731 can compute or estimate the monitored quantities. The reconfiguring of OTT connection 1750 can include message format, retransmission settings, preferred routing etc.; the reconfiguring need not affect base station 1720, and it can be unknown or imperceptible to base station 1720. Such procedures and functionalities can be known and practiced in the art. In certain embodiments, measurements can involve proprietary UE signaling facilitating host computer 1710's measurements of throughput, propagation times, latency and the like. The measurements can be implemented in that software 1711 and 1731 causes messages to be transmitted, in particular empty or 'dummy' messages, using OTT connection 1750 while it monitors propagation times, errors, etc.

FIG. 18 is a flowchart illustrating an exemplary method and/or procedure implemented in a communication system, in accordance with one embodiment. The communication system includes a host computer, a base station and a UE which, in some exemplary embodiments, can be those described with reference to other figures herein. For simplicity of the present disclosure, only drawing references to FIG. 18 will be included in this section. In step 1810, the host computer provides user data. In substep 1811 (which can be optional) of step 1810, the host computer provides the user data by executing a host application. In step 1820, the host computer initiates a transmission carrying the user data to the UE. In step 1830 (which can be optional), the base station transmits to the UE the user data which was carried in the transmission that the host computer initiated, in accordance with the teachings of the embodiments described throughout this disclosure. In step 1840 (which can also be optional), the UE executes a client application associated with the host application executed by the host computer.

FIG. 19 is a flowchart illustrating an exemplary method and/or procedure implemented in a communication system, in accordance with one embodiment. The communication system includes a host computer, a base station and a UE which can be those described with reference to other figures herein. For simplicity of the present disclosure, only drawing references to FIG. 19 will be included in this section. In step 1910 of the method, the host computer provides user data. In an optional substep (not shown) the host computer provides the user data by executing a host application. In step 1920, the host computer initiates a transmission carrying the user data to the UE. The transmission can pass via the base station, in accordance with the teachings of the embodiments described throughout this disclosure. In step 1930 (which can be optional), the UE receives the user data carried in the transmission.

FIG. 20 is a flowchart illustrating an exemplary method and/or procedure implemented in a communication system, in accordance with one embodiment. The communication system includes a host computer, a base station and a UE which can be those described with reference to other figures herein. For simplicity of the present disclosure, only drawing references to FIG. 20 will be included in this section. In step 2010 (which can be optional), the UE receives input data provided by the host computer. Additionally or alternatively, in step 2020, the UE provides user data. In substep 2021 (which can be optional) of step 2020, the UE provides the user data by executing a client application. In substep 2011 (which can be optional) of step 2010, the UE executes a client application which provides the user data in reaction to the received input data provided by the host computer. In providing the user data, the executed client application can further consider user input received from the user. Regardless of the specific manner in which the user data was provided, the UE initiates, in substep 2030 (which can be optional), transmission of the user data to the host computer. In step 2040 of the method, the host computer receives the user data transmitted from the UE, in accordance with the teachings of the embodiments described throughout this disclosure.

FIG. 21 is a flowchart illustrating an exemplary method and/or procedure implemented in a communication system, in accordance with one embodiment. The communication system includes a host computer, a base station and a UE which can be those described with reference to other figures herein. For simplicity of the present disclosure, only drawing references to FIG. 21 will be included in this section. In step 2110 (which can be optional), in accordance with the teachings of the embodiments described throughout this disclosure, the base station receives user data from the UE. In step 2120 (which can be optional), the base station initiates transmission of the received user data to the host computer. In step 2130 (which can be optional), the host computer receives the user data carried in the transmission initiated by the base station.

The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements, and procedures that, although not explicitly shown or described herein, embody the principles of the disclosure and can be thus within the spirit and scope of the disclosure. Various exemplary embodiments can be used together with one another, as well as interchangeably therewith, as should be understood by those having ordinary skill in the art.

The term unit, as used herein, can have conventional meaning in the field of electronics, electrical devices and/or electronic devices and can include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

As described herein, device and/or apparatus can be represented by a semiconductor chip, a chipset, or a (hardware) module comprising such chip or chipset; this, however, does not exclude the possibility that a functionality of a device or apparatus, instead of being hardware implemented, be implemented as a software module such as a computer program or a computer program product comprising executable software code portions for execution or being run on a processor. Furthermore, functionality of a device or apparatus can be implemented by any combination of hardware and software.

In addition, a device or apparatus can also be regarded as an assembly of multiple devices and/or apparatuses, whether functionally in cooperation with or independently of each other. Moreover, devices and apparatuses can be implemented in a distributed fashion throughout a system, so long as the functionality of the device or apparatus is preserved. As such, functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly defined herein.

In addition, certain terms used in the present disclosure, including the specification and drawings, can be used synonymously in certain instances (e.g., "data" and "information"). It should be understood, that although these terms (and/or other terms that can be synonymous to one another) can be used synonymously herein, there can be instances when such words can be intended to not be used synonymously. Further, to the extent that the prior art knowledge has not been explicitly incorporated by reference herein above, it is explicitly incorporated herein in its entirety. All publications referenced are incorporated herein by reference in their entireties.

Embodiments of the present disclosure also include, but are not limited to, the following enumerated examples:

1. A method for signaling resynchronization signal (RSS) configurations of neighbor cells to one or more user equipment (UE), the method comprising:
   determining a first configuration relating to a set of neighbor cells that are transmitting RSS according to respective RSS configurations;
   mapping, to the first configuration, the respective RSS configurations of a first subset of the set of neighbor cells;
   encoding the RSS configurations associated with the first subset according to a first encoding method;
   encoding the RSS configurations associated with a second subset of the set of neighbor cells according to a second encoding method; and
   transmitting the encoded RSS configurations of the set of neighbor cells to the one or more UEs.

2. The method of embodiment 1, wherein the RSS configurations of the neighbor cells comprise a plurality of parameters.

3. The method of embodiment 2, further comprising selecting the first subset based on a similarity between at least a portion of the plurality of parameters comprising RSS configurations and corresponding parameters associated with the first configuration.

4. The method of any of embodiments 2-3, wherein:
   the first configuration comprises a subset of the plurality of parameters comprising the RSS configurations; and
   mapping the respective RSS configurations of the first subset comprises mapping each of the parameters of the subset of the plurality to a corresponding parameter of the first configuration.
5. The method of embodiment 4, wherein:
   mapping a parameter of an RSS configuration to the corresponding parameter of the first configuration comprises mapping one of a first plurality of different values of the parameter of the RSS configuration to one of a second plurality of different values of the corresponding parameter of the first configuration; and
   the second plurality is less than the first plurality.
6. The method of any of embodiments 1-5, wherein:
   encoding the RSS configurations associated with the first subset according to a first encoding method comprises encoding each of the parameters of the RSS configurations into a number of bits based on a second plurality of different values of the corresponding parameter of the first configuration; and
   the second plurality is less than a first plurality of different values of the corresponding parameter of the RSS configurations associated with the first subset.
7. The method of any of embodiments 2-6, wherein:
   the plurality of parameters comprises a frequency location;
   determining the first configuration comprises partitioning bandwidths associated with the neighbor cells into a plurality of sub-bandwidths; and
   mapping the respective RSS configurations of the first subset comprises determining which of the sub-bandwidths corresponds to the frequency location of the respective RSS configuration.
8. The method of embodiment 7, wherein the plurality of sub-bandwidths are of equal width, with the equal width being greater than the actual RSS bandwidth.
9. The method of any of embodiments 2-8, wherein:
   the plurality of parameters comprises a time offset;
   determining the first configuration comprises determine an RSS signal periodicity; and
   mapping the respective RSS configurations of the first subset comprises comparing the respective time offsets to a fraction of the signal periodicity; and
   encoding the RSS configurations associated with the first subset according to a first encoding method comprises selecting values for encoding the respective time offsets based on the results of the respective comparisons.
10. The method of any of embodiments 1-9, wherein the second subset comprises the remainder of the set of neighbor cells that are not included in the first subset.
11. The method of embodiment 10, wherein encoding the RSS configurations associated with the second subset according to a second encoding method comprises encoding each of the parameters of the RSS configurations into a number of bits based on a first plurality of different values of the particular parameter of the RSS configurations.
12. The method of any of embodiments 1-11, wherein the encoded RSS configurations of the set of neighbor cells are transmitted together with indicators of whether the respective RSS configurations are encoded according to the first encoding method or the second encoding method.
13. A method for receiving resynchronization signal (RSS) configurations of neighbor cells from a network node, the method comprising:
   receiving, from the network node, encoded RSS configurations of a set of neighbor cells, wherein the RSS configurations of a first subset of the neighbor cells are encoded according to a first encoding method, and the RSS configurations of a second subset of the neighbor cells are encoded according to a second encoding method;
   determining the first subset and the second subset;
   decoding each of the RSS configurations of the first subset into a plurality of parameters, wherein at least one of the parameters is decoded as a range that includes a plurality of actual parameter values.
14. The method of embodiment 13, further comprising:
   receiving RSS from the first subset according to the respective decoded RSS configurations, including the at least one parameter decoded as a range; and
   determining the actual parameter value for the at least one parameter based on receiving the RSS.
15. The method of any of embodiments 13-14, further comprising decoding each of the RSS configurations of the second subset into the plurality of parameters, wherein each parameter is decoded as the actual parameter value.
16. The method of any of embodiments 13-15, further comprising sending a request, to the network node, for RSS configurations for neighbor cells, wherein the encoded RSS configurations are received in response to the request.
17. The method of any of embodiments 13-16, wherein:
   the at least one parameter includes a frequency location;
   the frequency location is decoded as a sub-bandwidth that includes a plurality of possible RSS frequency locations; and
   the actual RSS frequency location, for each neighbor cell of the first subset, is determined based on receiving signals at one or more of the possible RSS frequency locations.
18. The method of any of embodiments 13-17, wherein:
   the at least one parameter includes a time offset;
   the time offset is decoded as either a first value less than a fraction of the RSS periodicity, or a second value greater than the fraction of the RSS periodicity; and
   the actual time offset, for each neighbor cell of the first subset, is determined based on receiving signals at one or more possible time offsets having a spacing therebetween that is less than the fraction of the RSS periodicity.
19. The method of any of embodiments 1-9, wherein the second subset comprises the remainder of the set of neighbor cells that are not included in the first subset.
20. The method of embodiment 19, further comprising decoding each of the RSS configurations of the second subset into a plurality of parameters, wherein each of the parameters is decoded as an actual parameter value.
21. The method of any of embodiments 13-20, wherein the encoded RSS configurations of the set of neighbor cells are received together with indicators of whether the respective RSS configurations are encoded according to the first encoding method or the second encoding method, and determining the first subset and the second subset is based on the indicators.
22. A network node, in a wireless communication network, configured to signal resynchronization signal (RSS) configurations of neighbor cells to one or more user equipment (UE), the network node comprising:
   communication circuitry configured to communicate with one or more UEs; and processing circuitry operatively associated with the communication circuitry and configured to perform operations corresponding to the methods of any of exemplary embodiments 1-12.

23. A network node, in a wireless communication network, configured to signal resynchronization signal (RSS) configurations of neighbor cells to one or more user equipment (UE), the network node being arranged to perform operations corresponding to the methods of any of exemplary embodiments 1-12.

24. A non-transitory, computer-readable medium storing computer-executable instructions that, when executed by at least one processor of a network node, configure the network node to perform operations corresponding to the methods of any of exemplary embodiments 1-12.

25. A user equipment (UE) configured to receive resynchronization signal (RSS) configurations of neighbor cells, the UE comprising:
   communication circuitry configured to communicate with a serving node in a wireless communication network; and
   processing circuitry operatively associated with the communication circuitry and configured to perform operations corresponding to the methods of any of exemplary embodiments 13-21.

26. A user equipment (UE) configured to receive resynchronization signal (RSS) configurations of neighbor cells, the UE being arranged to perform operations corresponding to the methods of any of exemplary embodiments 13-21.

27. A non-transitory, computer-readable medium storing computer-executable instructions that, when executed by at least one processor of a user equipment (UE), configure the UE to perform operations corresponding to the methods of any of exemplary embodiments 13-21.

The invention claimed is:

1. A method, performed by a network node in a wireless network, for signaling resynchronization signal, RSS, configurations of neighbor cells to one or more user equipment, UE, the method comprising:
   encoding a plurality of parameters of respective RSS configurations of one or more neighbor cells, wherein for each particular neighbor cell:
      the plurality of parameters include one or more RSS frequency locations and an RSS time offset for the particular neighbor cell, and
      the encoding is based on a bitmap and a parameter associated with the particular neighbor cell; and
   wherein encoding the one or more RSS frequency locations of the respective RSS configurations includes, for each particular neighbor cell:
      for each of a plurality of narrowbands comprising the particular neighbor cell's carrier bandwidth, determining whether the particular neighbor cell is transmitting RSS within a particular narrowband; and
      encoding transmission determinations for the respective narrowbands in respective bits of a bitmap associated with the particular neighbor cell, wherein the bitmap is one of the encoded parameters; and
   transmitting, to the one or more UEs, at least a portion of the encoded parameters of the respective RSS configurations of the neighbor cells.

2. The method of claim 1, wherein:
   each narrowband includes a plurality of candidate RSS frequency locations; and
   the encoded parameters, transmitted to the UEs, do not include indications of particular candidate RSS frequency locations used for transmitting RSS within the respective narrowbands.

3. The method of claim 2, wherein for each particular neighbor cell, the particular candidate RSS frequency locations used for transmitting RSS within the respective narrowbands are related to the parameter associated with the particular neighbor cell.

4. The method of claim 1, wherein:
   encoding the RSS time offsets of the respective RSS configurations is based on the respective parameters associated with the respective neighbor cells;
   the encoded parameters, transmitted to the UEs, do not include indications of the encoded RSS time offsets.

5. The method of claim 1, wherein the parameters associated with the respective neighbor cells are respective physical cell identifiers (PCIs).

6. The method of claim 1, wherein the transmitted encoded parameters also include respective RSS power offsets relative to a reference signal.

7. The method of claim 1, further comprising receiving a request, from a UE, for RSS configurations for neighbor cells, wherein the encoded parameters are transmitted in response to the request.

8. A network node, in a wireless network, configured to signal resynchronization signal, RSS, configurations of neighbor cells to one or more user equipment, UEs, the network node comprising:
   communication interface circuitry configured to communicate with one or more UEs; and
   processing circuitry operably coupled with the communication interface circuitry, whereby the processing circuitry and the communication interface circuitry are configured to perform operations corresponding to the method of claim 1.

9. A network node comprising a processing circuitry, in a wireless network, configured to signal resynchronization signal, RSS, configurations of neighbor cells to one or more user equipment, UEs, the network node being further arranged to perform operations corresponding to the method of claim 1.

10. A non-transitory, computer-readable medium storing program instructions that, when executed by processing circuitry of a network node in a wireless network, configure the network node to perform operations corresponding to the method of claim 1.

11. A method, performed by a user equipment, for receiving resynchronization signal (RSS) configurations of neighbor cells from a network node in a wireless network, the method comprising:
   receiving, from the network node, encoded parameters of respective RSS configurations of one or more neighbor cells; and
   determining the respective RSS configurations of the neighbor cells based on the encoded parameters and on respective parameters associated with the respective neighbor cells, wherein the RSS configuration, for each neighbor cell, includes one or more RSS frequency locations and an RSS time offset, wherein the one or more RSS frequency locations of respective RSS configurations is determined, for each particular neighbor cell, in response to:
      a determination of whether RSS is being transmitted within a particular narrowband for each of a plurality of narrowbands comprising the particular neighbor cell's carrier bandwidth; and transmission determinations for respective narrowbands being encoded in respective bits of a bitmap associated with the particular neighbor cell, wherein the bitmap is one of the encoded parameters.

12. The method of claim 11, wherein:
the encoded parameters, for each neighbor cell, includes the bitmap indicating the one or more RSS frequency locations; and
determining the respective RSS configurations comprises, for each particular neighbor cell and for each of a plurality of narrowbands comprising the particular neighbor cell's carrier bandwidth, determining whether the particular neighbor cell is transmitting RSS within the particular narrowband based on a corresponding bit in the bitmap associated with the particular neighbor cell.

13. The method of claim 12, wherein:
each narrowband includes a plurality of candidate RSS frequency locations; and
the encoded parameters, received from the network node, do not include indications of candidate RSS frequency locations within the respective narrowbands.

14. The method of claim 13, wherein determining the respective RSS configurations further comprises, for each particular neighbor cell and for each particular narrowband in which the particular neighbor cell is transmitting RSS, determining an RSS frequency location within the particular narrowband based on a parameter associated with the particular neighbor cell.

15. The method of claim 14, wherein the parameters associated with the respective neighbor cells are respective physical cell identifiers (PCIs).

16. The method of claim 11, wherein:
the respective RSS configurations of the neighbor cells include respective RSS time offsets; and
the encoded parameters, received from the network node, do not include indications of the respective RSS time offsets.

17. The method of claim 16, wherein determining the respective RSS configurations further comprises determining the respective RSS time offsets based on respective parameters associated with the respective neighbor cells.

18. The method of claim 11, wherein the received encoded parameters also include respective RSS power offsets relative to a reference signal.

19. The method of claim 11, further comprising transmitting a request, to the network node, for RSS configurations for the neighbor cells, wherein the encoded parameters are received in response to the request.

20. A user equipment, UE configured to receive resynchronization signal, RSS, configurations of neighbor cells from a network node in a wireless network, the UE comprising:
radio interface circuitry configured to communicate with the network node; and
processing circuitry operably coupled with the radio interface circuitry, whereby the processing circuitry and the radio interface circuitry are configured to perform operations corresponding to the method of claim 11.

21. A user equipment, UE comprising a processing circuitry configured to receive resynchronization signal, RSS, configurations of neighbor cells from a network node in a wireless network, the UE being further arranged to perform operations corresponding to the method of claim 11.

22. A non-transitory, computer-readable medium storing program instructions that, when executed by processing circuitry of a user equipment, UE, configure the UE to perform operations corresponding to the method of claim 11.

* * * * *

UNITED STATES PATENT AND TRADEMARK OFFICE
CERTIFICATE OF CORRECTION

| | | |
|---|---|---|
| PATENT NO. | : 12,170,970 B2 | Page 1 of 1 |
| APPLICATION NO. | : 17/427699 | |
| DATED | : December 17, 2024 | |
| INVENTOR(S) | : Åström et al. | |

It is certified that error appears in the above-identified patent and that said Letters Patent is hereby corrected as shown below:

In the Specification

In Column 2, Line 3, delete "third-" and insert -- third-generation --, therefor.

In Column 10, Line 16, delete "(AMF)," and insert -- (SMF), --, therefor.

In Column 10, Lines 39-40, delete "mobile-type" and insert -- machine-type --, therefor.

In Column 16, Line 21, delete "than" and insert -- that --, therefor.

In Column 18, Line 42, delete "e.g., 1 %." and insert -- e.g., ¼. --, therefor.

In Column 23, Lines 46-47, delete "Retransmission" and insert -- Repeat --, therefor.

In Column 28, Line 43, delete "mobile-type" and insert -- machine-type --, therefor.

Signed and Sealed this
Thirtieth Day of December, 2025

John A. Squires
*Director of the United States Patent and Trademark Office*